(12) United States Patent
Wang

(10) Patent No.: US 12,552,235 B1
(45) Date of Patent: Feb. 17, 2026

(54) PICKUP TRUCK REAR COMPARTMENT COVER

(71) Applicant: WENZHOU KOUVI HARDWARE CO. LTD., Zhejiang (CN)

(72) Inventor: Cheng Feng Wang, Wenzhou (CN)

( * ) Notice: Subject to any disclaimer, the term of this patent is extended or adjusted under 35 U.S.C. 154(b) by 0 days.

(21) Appl. No.: 19/218,031

(22) Filed: May 23, 2025

(51) Int. Cl.
 *B60J 7/14* (2006.01)
 *B60J 7/19* (2006.01)

(52) U.S. Cl.
 CPC .............. *B60J 7/141* (2013.01); *B60J 7/198* (2013.01)

(58) Field of Classification Search
 CPC ........... B60J 7/141; B60J 7/1607; B60J 7/198
 USPC ............ 296/100.02, 100.04, 100.06, 100.07, 296/100.09
 See application file for complete search history.

(56) References Cited

U.S. PATENT DOCUMENTS

| | | | |
|---|---|---|---|
| 8,690,224 B2 | 4/2014 | Maimin et al. | |
| 10,286,765 B2 * | 5/2019 | Williamson | B60P 7/00 |
| 10,988,009 B1 * | 4/2021 | Weng | B60J 7/141 |
| 11,007,856 B1 * | 5/2021 | Fu | B60J 7/198 |
| 11,097,605 B2 * | 8/2021 | Mahler | B62D 33/046 |
| 11,642,948 B2 * | 5/2023 | Schmeichel | B60J 7/141 296/100.07 |
| 11,673,459 B2 * | 6/2023 | Dylewski, II | B60J 7/1607 296/100.09 |
| 11,685,242 B2 * | 6/2023 | Schmeichel | B60J 7/198 296/100.07 |
| 11,890,921 B2 * | 2/2024 | Qiu | B60J 7/198 |
| 12,251,997 B2 * | 3/2025 | Qiu | B60J 7/141 |
| 2004/0164583 A1 * | 8/2004 | Wheatley | B60J 7/102 296/100.02 |

* cited by examiner

*Primary Examiner* — Jason S Daniels
(74) *Attorney, Agent, or Firm* — Che-Yang Chen; Law Office of Michael Chen

(57) ABSTRACT

A pickup truck rear compartment cover including a cover mechanism that includes a first cover, a second cover and a third cover that are connected in sequence, a fixing mechanism is provided between the lower surface of the first cover and the side wall of the rear compartment, a locking mechanism is provided between the lower surfaces of the second cover and the third cover and the side wall of the rear compartment, a connecting mechanism is provided between the first cover and the second cover and between the second cover and the third cover, respectively, and the cover mechanism has a first state which is laid flat and covers the rear compartment, and a second state which is folded and stacked and opens the rear compartment.

14 Claims, 27 Drawing Sheets

PICKUP TRUCK REAR COMPARTMENT COVER

FIELD OF THE INVENTION

The present invention relates to the field of automobile accessories, in particular to a rear compartment cover of a pickup truck.

BACKGROUND OF THE INVENTION

A pickup truck will have a cover on the rear compartment for protection, but traditional rear compartment cover usually has a front cover and a rear cover, and the front cover needs to be opened and closed by a gas pressure strut. This structure has disadvantages of poor practicality and inconvenient to operate.

SUMMARY OF THE INVENTION

In order to overcome the shortcomings of traditional rear covers, the present invention provides a pickup truck rear compartment cover which has good practicality and is easy to operate.

In one aspect, a pickup truck rear compartment cover may include a cover mechanism, which includes a first cover, a second cover and a third cover connected in sequence; a fixing mechanism disposed between a lower surface of the first cover and a side wall of the rear compartment; a locking mechanism disposed between lower surfaces of the second cover and the third cover and the side wall of the rear compartment; a connecting mechanism disposed between the first cover and the second cover and between the second cover and the third cover; the cover mechanism has a first state which is laid flat and covers the rear compartment and a second state which is folded and stacked and opens the rear compartment.

In one embodiment, the locking mechanism includes a lock plate assembly installed on the two side walls of the rear compartment, and a plurality of lock tongue assemblies and a plurality of operating assemblies installed on the lower surfaces of the second cover plate and the third cover plate. The lock tongue assemblies are located on both sides of all the operating assemblies.

A pull rope connecting one operating assembly and another lock tongue assembly is provided between the two, and the pull rope passes through another operating assembly located between the operating assembly and the lock tongue assembly. The lock plate assembly includes a first lock plate extending toward the lock tongue assembly, and the lock tongue assembly is located directly below the first lock plate when it is not unlocked by the operating assembly.

In one embodiment, the locking tongue assembly comprises a lock tongue seat, which is slidably mounted on both sides of the lower surface of the second cover plate and the third cover plate; and a lock tongue, which is mounted on the lock tongue seat.

In one embodiment, the lock tongue seat has a first sliding groove which is arranged along the length direction and passes through from top to bottom, and step surfaces are arranged on both sides of the lower part of the first sliding groove. A first adjustment component for adjusting the installation position of the lock tongue on the lock tongue seat is arranged between the lock tongue and the lock tongue seat. The first adjustment component adopts a first bolt passing through the lock tongue and a first nut which is threadedly matched with the first bolt, and the first nut is in contact with the step surface. A plurality of first positioning grooves which are arranged along the length direction are arranged on the upper surface of the lock tongue seat, and a first positioning block which is adapted to the first positioning groove is arranged at the lower part of the lock tongue.

In one embodiment, the operating components include a base, which is fixedly mounted on the lower surfaces of the second cover plate and the third cover plate; a handle rotatably mounted on the base; and a rotating frame, which is rotatably mounted on the base and linked to the handle.

The pull rope passes through all the rotating frames and the base in sequence and is connected to the lock tongue seat. An elastic member is arranged between the base and the lock tongue seat to abut against the two.

Fixed limiting beads are respectively provided at both ends of the pull rope and at the position corresponding to the rotating frame, and the lock tongue seat has a notch through which the pull rope passes, and the size of the notch is smaller than the outer diameter of the limiting beads.

Light panels are installed on the lower surfaces of the second cover plate and the third cover plate; wherein the second cover plate and the third cover plate are provided with a first mounting groove and a groove body embedded in the first mounting groove and for placing the lock tongue assembly, the operating assembly and the light board, the groove body is provided with a cover sheet for covering, and the light board is fixedly connected to the cover sheet.

Both sides of the lock tongue seat and the base are respectively provided with ribs arranged along the length direction, and the two side walls of the groove body are provided with guide grooves that slide with the ribs, and the two sides of the lower surface of the cover plate are provided with positioning plates inserted into the groove body and abutting against the inner walls of the two sides of the groove body;

Wing plates are provided on both sides of the groove body and are fixedly mounted on the lower surfaces of the second cover plate and the third cover plate by rivets. A limit seat for limiting positioning is provided in the groove body at a position next to the base and the lock tongue seat, and screws are provided between the cover plate and the limit seat to connect the two.

The lock plate assembly also includes a first inner clamping plate and a first outer clamping plate. The first lock plate is adjustably mounted on a side surface of the first inner clamping plate away from the side wall of the rear compartment. The cross-section of the first lock plate is an inverted L-shape. A first fastener connecting the first inner clamping plate and the first outer clamping plate is provided between the two. A first vertically arranged strip hole is provided on the first inner clamping plate. The first fastener passes through the first strip hole and is threadedly engaged with the first outer clamping plate.

A locking bolt connecting the first inner plate and the first lock plate is provided between the two, and the side wall surfaces where the two are in contact with each other are provided with positioning lines, the positioning lines are V-shaped grooves, and the first lock plate is provided with a vertically arranged second strip hole, and the locking bolt passes through the second strip hole and cooperates with the thread of the first inner plate; the upper end of the first inner plate is provided with a hanging plate portion which extends laterally and is used to be hung on the top end of the side wall of the rear compartment.

A plurality of second positioning grooves arranged vertically are provided on a surface of one side of the first inner clamping plate facing the first outer clamping plate, a plug inserted into the second positioning groove is provided at the bottom end of the first outer clamping plate, and the second positioning groove and the plug are matched in an arc.

The upper end of the first outer clamping plate is provided with a first arc-shaped protrusion and a first cushion block mounted on the first arc-shaped protrusion, the first cushion block is provided with a first arc-shaped groove adapted to the first arc-shaped protrusion and realizing a swinging motion; the first cushion block is provided with a first anti-slip pattern on one side facing the first inner clamping plate.

The first inner clamping plate is provided with thread-matched adjusting screws at both ends in the horizontal direction, and the first locking plate is provided with a plurality of avoidance holes for avoiding the adjusting screws.

The connecting mechanism comprises a first connecting member, which is installed on both sides of the second cover plate, on the side of the first cover plate close to the second cover plate, and on the side of the third cover plate close to the second cover plate; a second connecting member, which is movably installed between two adjacent first connecting members; and a connecting strip extends outward from the upper edge of the first connecting member, and second mounting grooves for inserting the connecting strip are symmetrically arranged on both sides of the second connecting member. The connecting strip has a first state in which the second mounting groove is covered when the cover mechanism is not folded, and a second state in which the connecting strip is inserted along the trajectory of the inner wall of the second mounting groove when the cover mechanism is folded. There is a gap between the inner wall of the second mounting groove and the outer wall of the connecting strip. When the connecting strip is in the first state, a drainage channel for rainwater to flow is formed inside the second mounting groove.

The cross section of the second mounting groove is a quarter circle, the second mounting groove includes an arc inner wall surface, an opening located at the upper end of the arc inner wall surface, and a vertical surface located at the other end of the arc inner wall surface, and the connecting strip includes an arc-shaped edge entering from the opening and matching with the arc inner wall surface, and a limiting surface contacting and matching with the vertical surface.

An arc-shaped hook is arranged at the upper end of the vertical surface, and an arc-shaped convex strip which is rotatably matched with the arc-shaped hook is arranged at the end position of the limiting surface of the connecting strip.

Fixedly mounted protective covers are provided at both ends of the second connecting member, and the protective covers are provided with water outlets connected to the drainage channel. The cover mechanism is also provided with protective strips covering the edges and protective corners covering the four corners. The protective corners are located between two protective strips and are plugged into and matched with the protective strips. The protective strips cover the gaps between the protective covers and the cover mechanism, and the protective corners are also provided with shields extending outwardly and used to cover the gaps.

A safety buckle assembly is installed at the edge of the upper surface of the first cover plate, and the safety buckle assembly includes a buckle seat, a buckle and a safety belt. A handle for winding the safety belt is provided on the lower surface of the second cover plate.

The fixing mechanism comprises a fixing seat, which is fixedly mounted on the lower surface of the first cover plate; a second inner clamping plate and a second outer clamping plate, the two being used in cooperation to clamp the rear compartment side wall; a second adjustment component for adjusting the installation position of the second inner clamping plate is provided between the fixing seat and the second inner clamping plate.

The fixing seat is provided with a second sliding groove arranged along the length direction, and the upper end of the second inner clamping plate is provided with a flat plate portion that fits the fixing seat. The second adjustment assembly includes a second bolt and a second nut slidably installed in the second sliding groove, the second bolt passes through the flat plate portion and is threadedly engaged with the second nut, and the end position of the second sliding groove is provided with a circular hole for the second bolt head to pass through.

A third mounting groove for fixing the fixing seat and a shielding plate for covering the fixing seat are provided on the lower surface of the first cover plate, and a second fastener connecting the second outer clamping plate and the second inner clamping plate is provided between the two.

A third arc-shaped protrusion is provided at the lower end of the second outer clamping plate, and a third arc-shaped groove is provided at the lower end of the second inner clamping plate to match the third arc-shaped protrusion and to allow the third arc-shaped protrusion to be installed.

The upper end of the second outer clamping plate is provided with a second arc groove and a second pad embedded in the second arc groove, and the second pad is provided with a second arc protrusion adapted to the second arc groove and realizing a swinging motion; the second pad and the second inner clamping plate are provided with a second anti-slip pattern on one side facing the side wall of the rear compartment.

The advantages of the present invention are as follows: the cover mechanism can be divided into three parts, the first cover is fixedly installed on the rear compartment by a fixing mechanism, and the second cover and the third cover can be opened and closed by a locking mechanism, the second cover and the third cover can be folded and stacked by a connecting mechanism when opened, and stacked above the first cover, and when operating the locking mechanism, only one side needs to be operated to open the other side at the same time, which significantly simplifies the operation process, and the connecting mechanism can also be used for drainage while folding, which has the advantages of good practicality and easy operation.

DETAILED DESCRIPTION OF THE INVENTION

Figure 1:
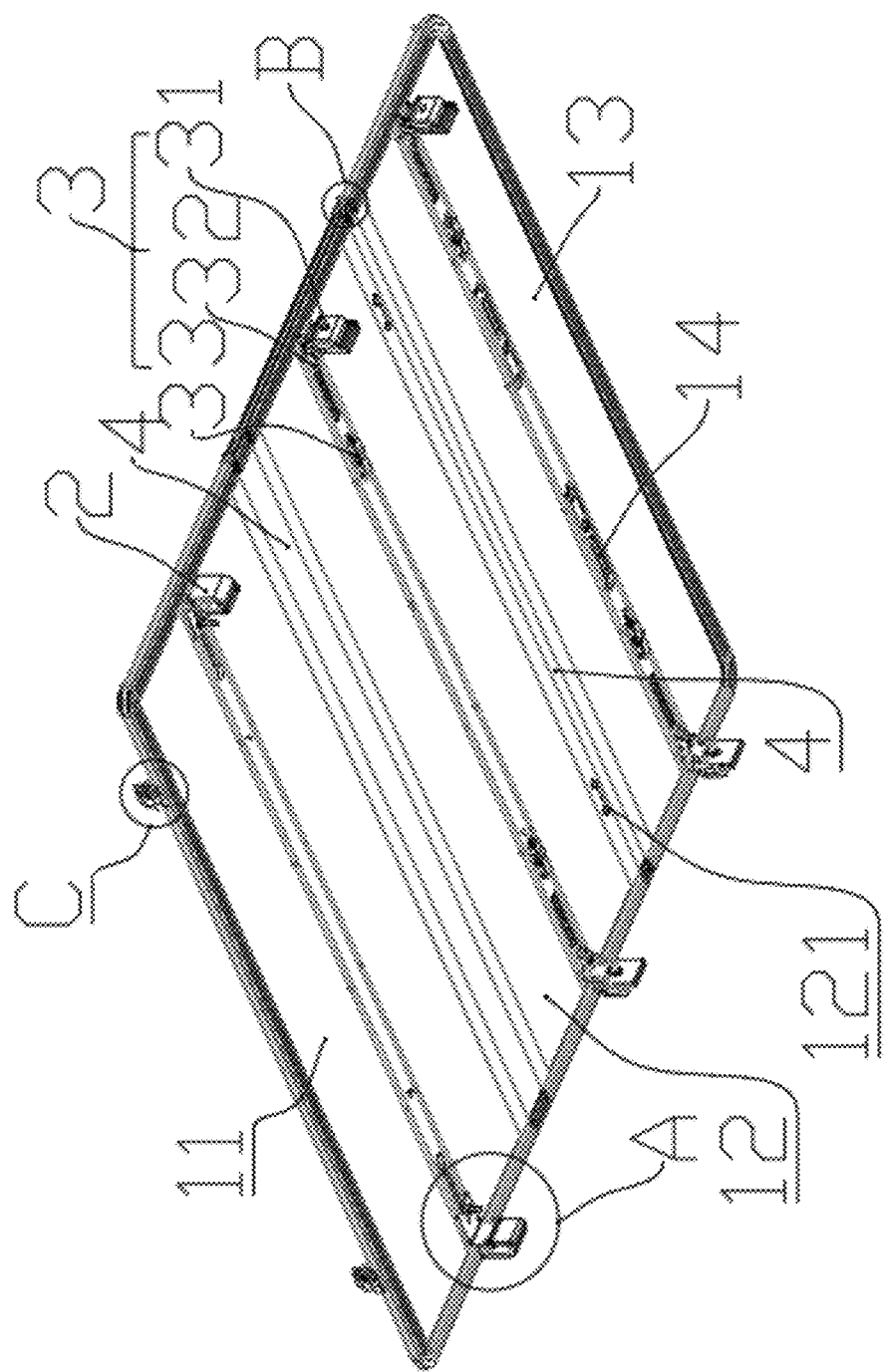
FIG. 1 is a schematic structural diagram of a pickup truck rear compartment cover according to an embodiment of the present invention.
Figure 2:
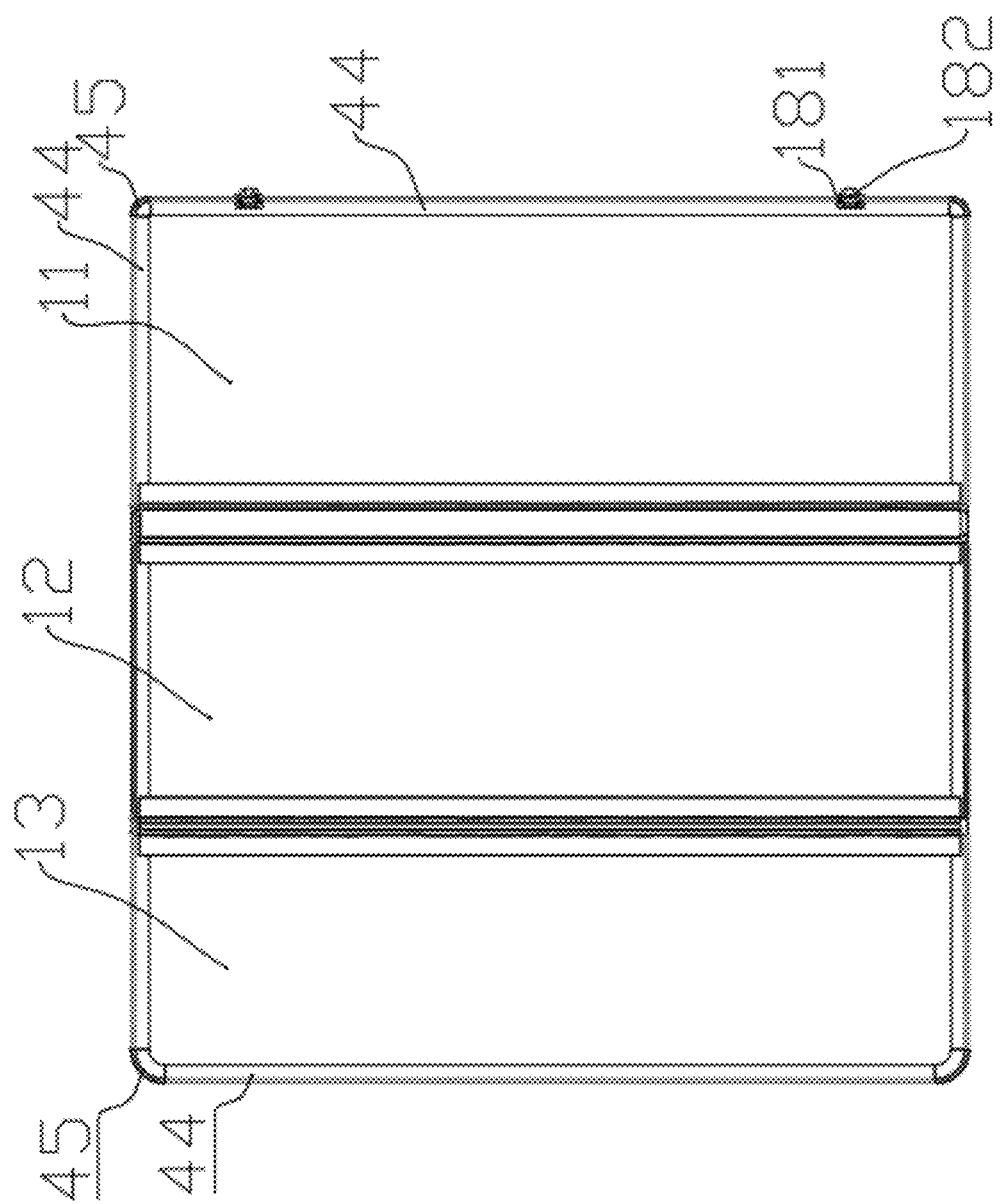
FIG. 2 is a top view of the pickup truck rear compartment cover when it is laid flat.
Figure 3:
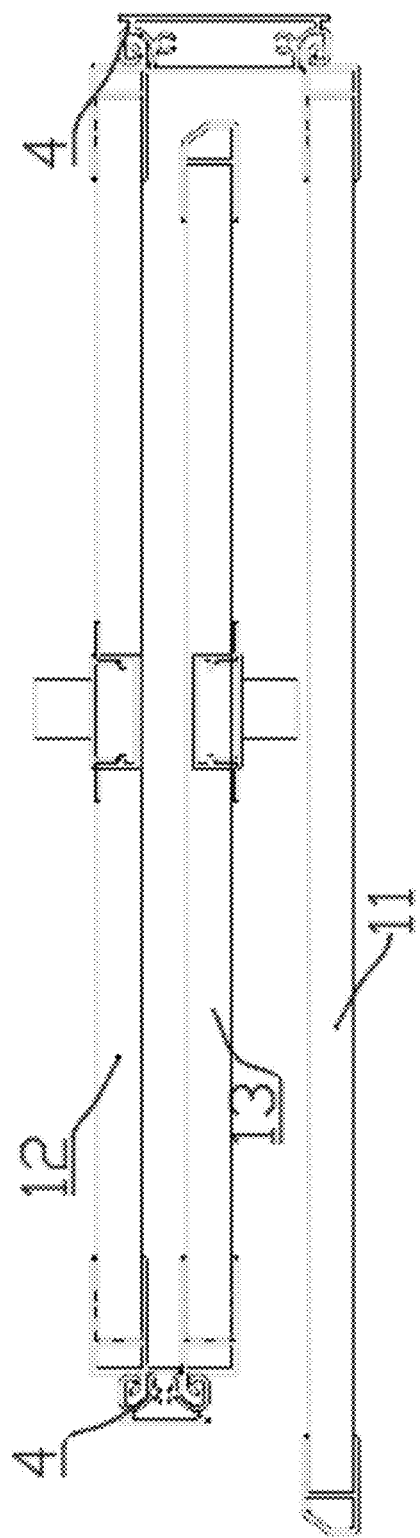
FIG. 3 is a schematic diagram of the structure of the pickup truck rear compartment cover after being folded and stacked.
Figure 4:
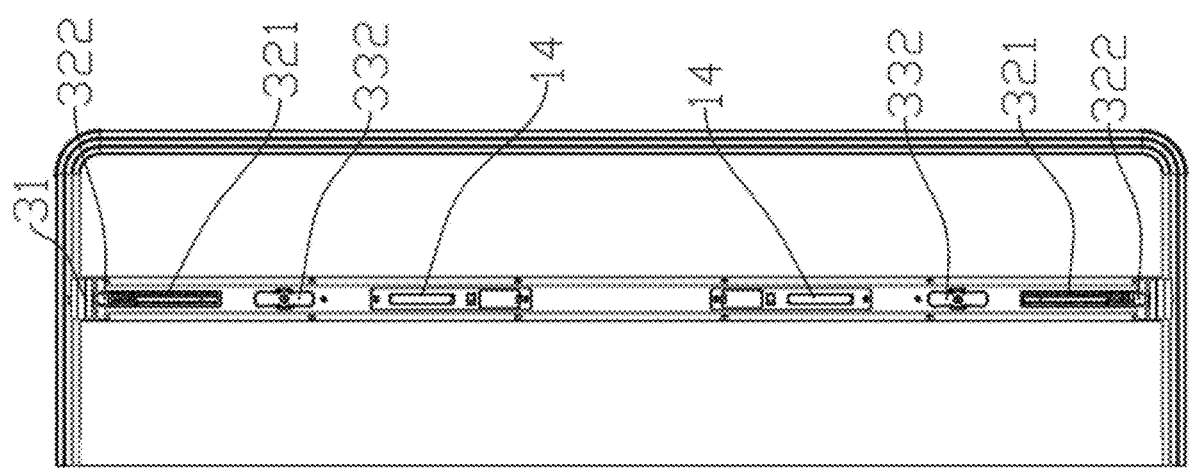
FIG. 4 is a schematic structural diagram of the lower surface of the third cover plate.
Figure 5:
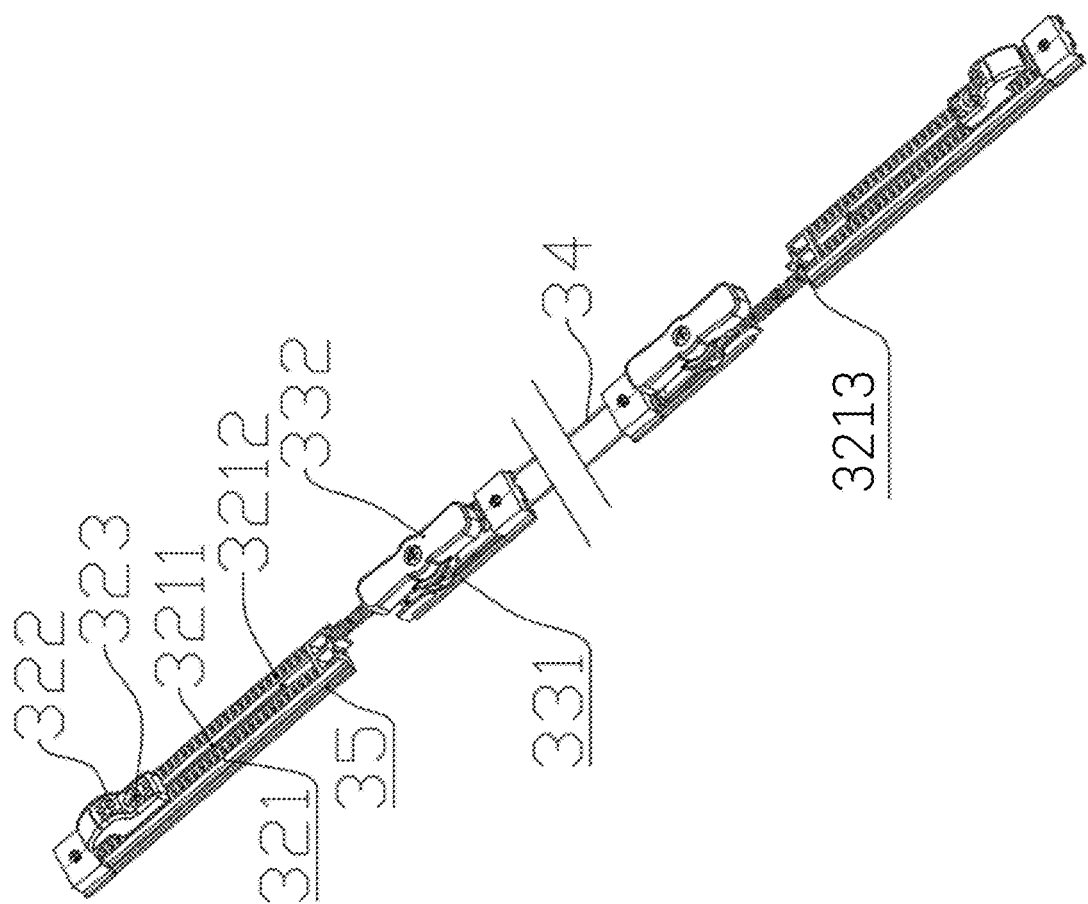
FIG. 5 is a schematic structural diagram of a locking tongue assembly and an operating assembly.
Figure 6:
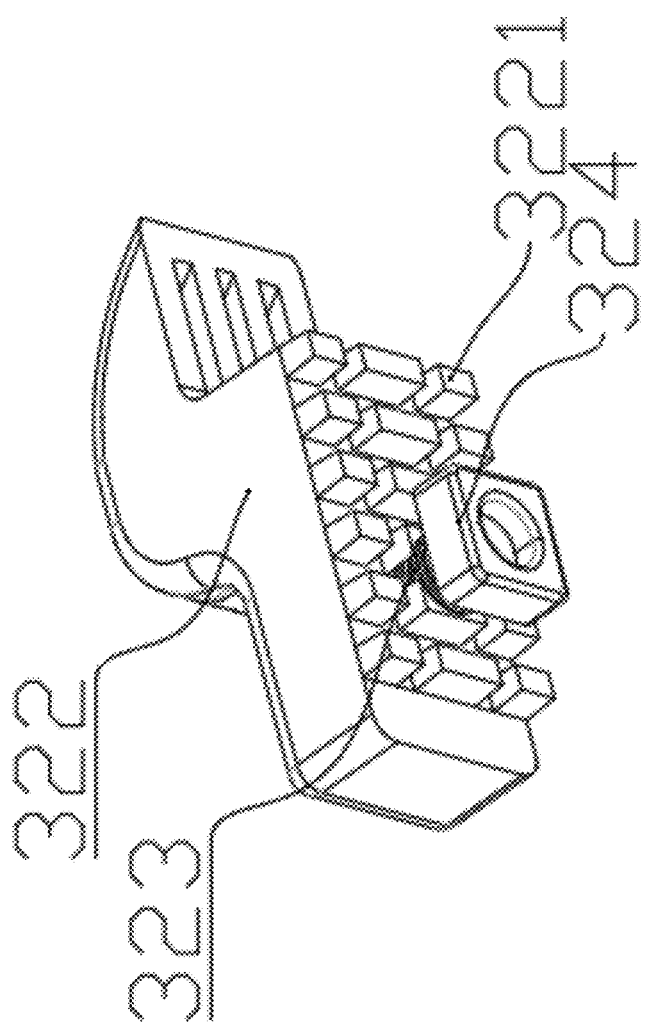
FIG. 6 is a schematic structural diagram of a locking tongue.
Figure 7:
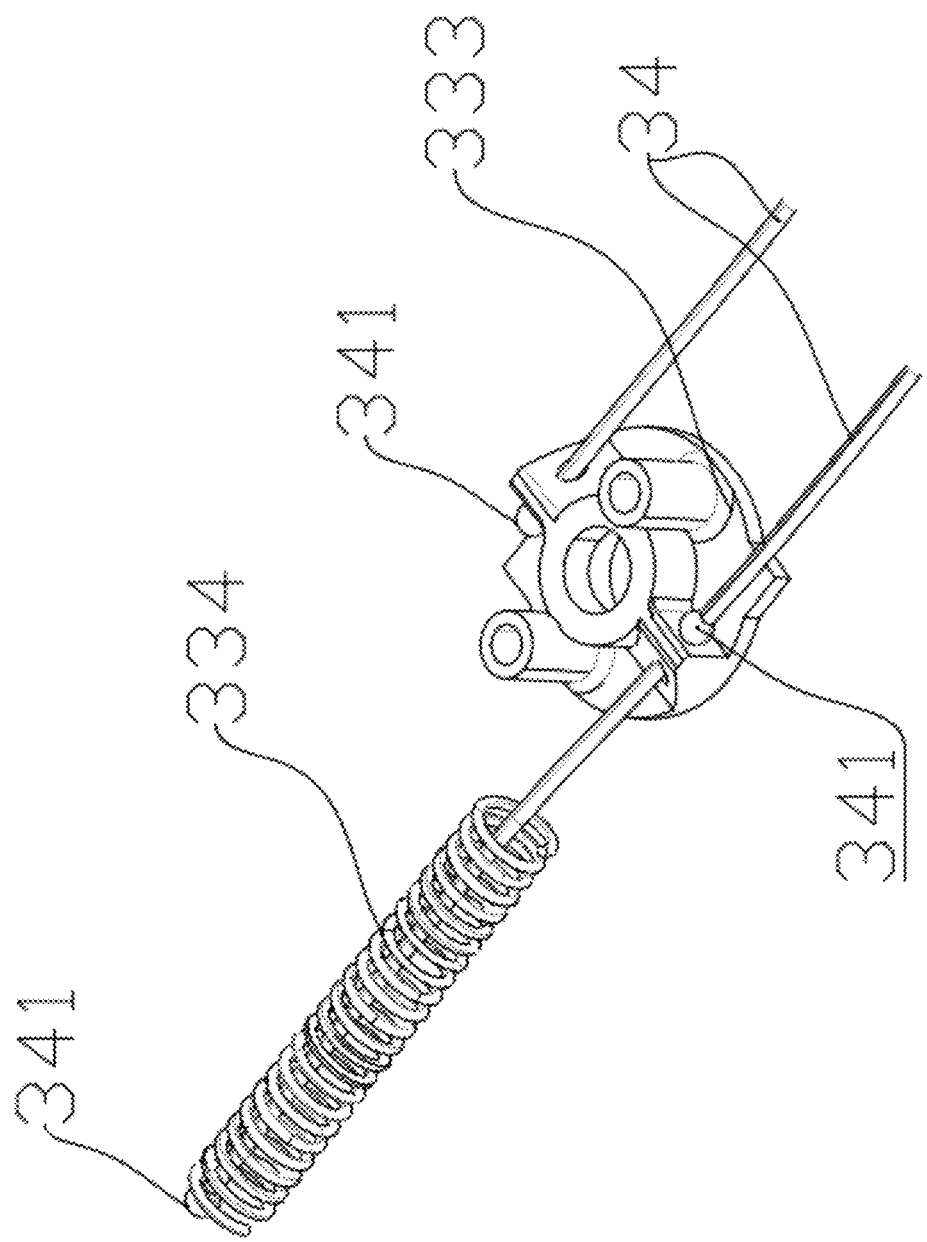
FIG. 7 is a schematic diagram of the structure of the rotating frame and the pull rope.
Figure 8:
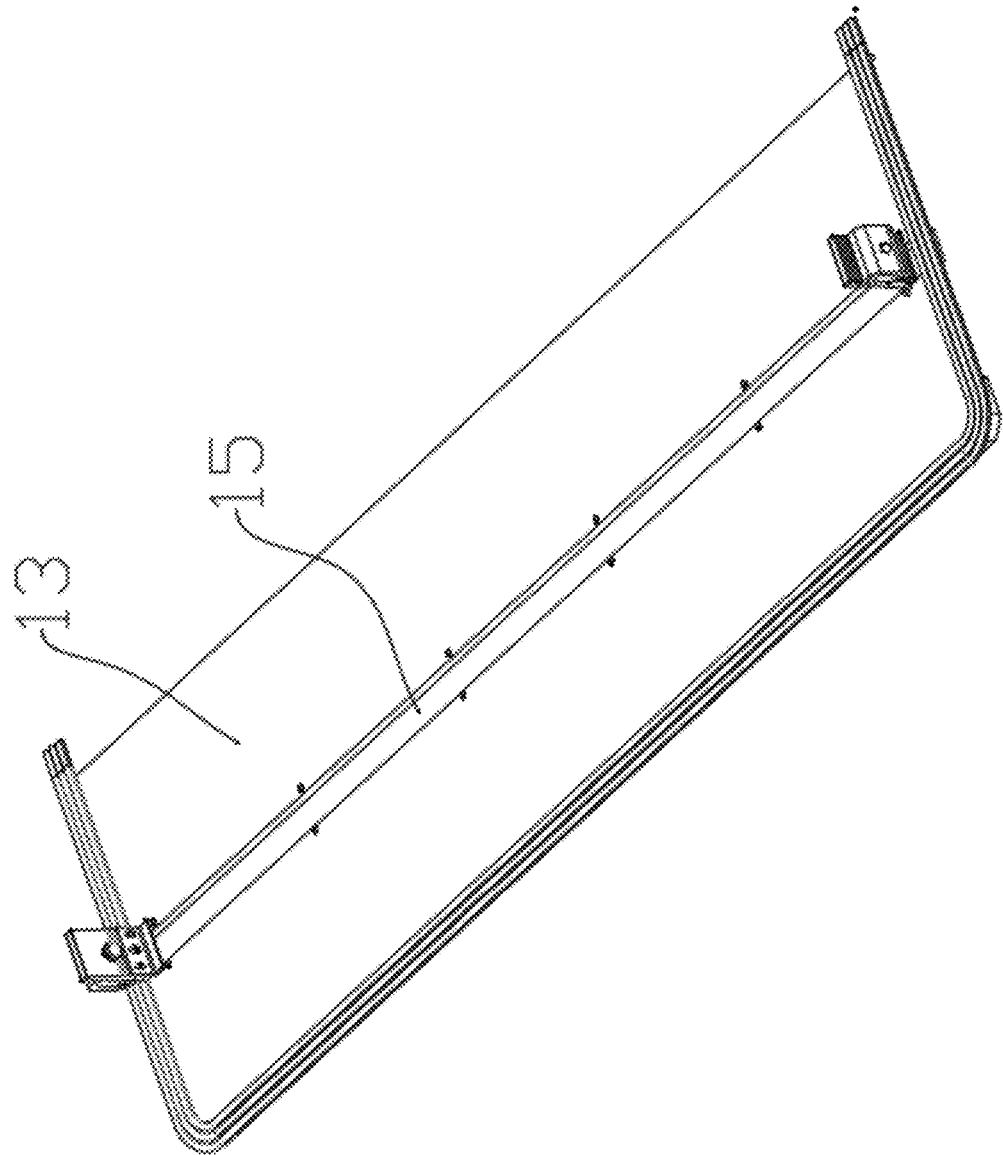
FIG. 8 is a schematic diagram of the structure of the lower surface of the third cover plate after removing the lock tongue assembly and the operating assembly.
Figure 9:
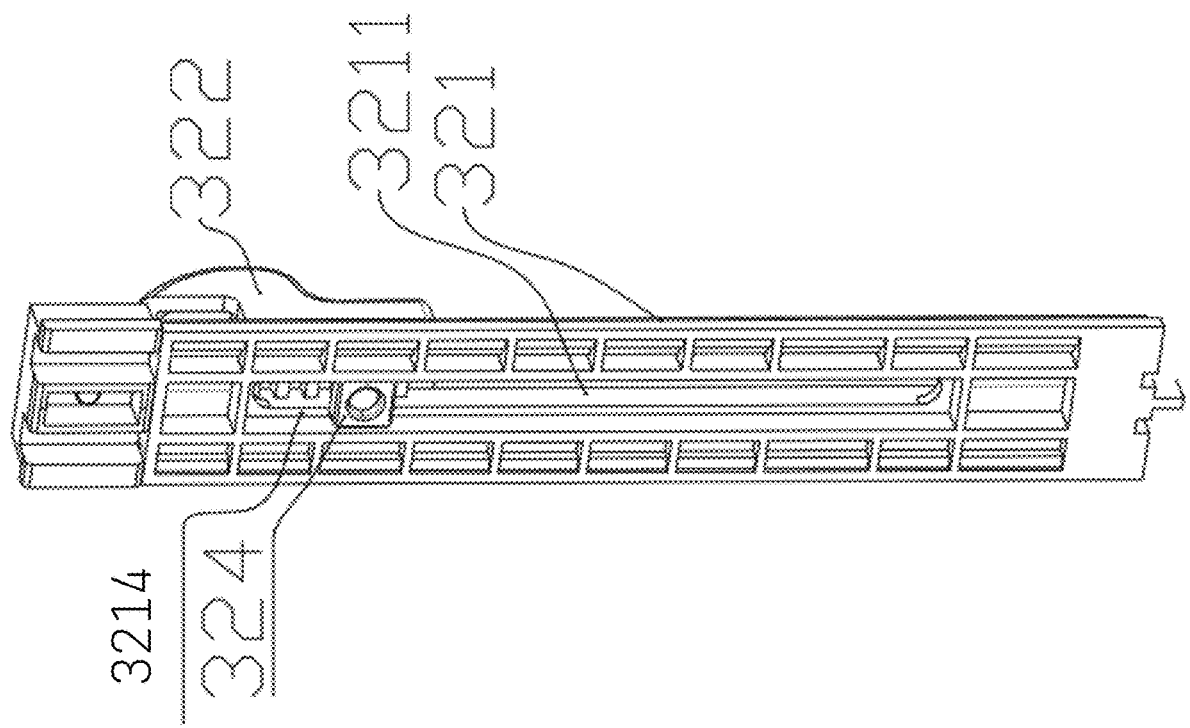
FIG. 9 is a schematic structural diagram of a lock tongue seat.
Figure 10:
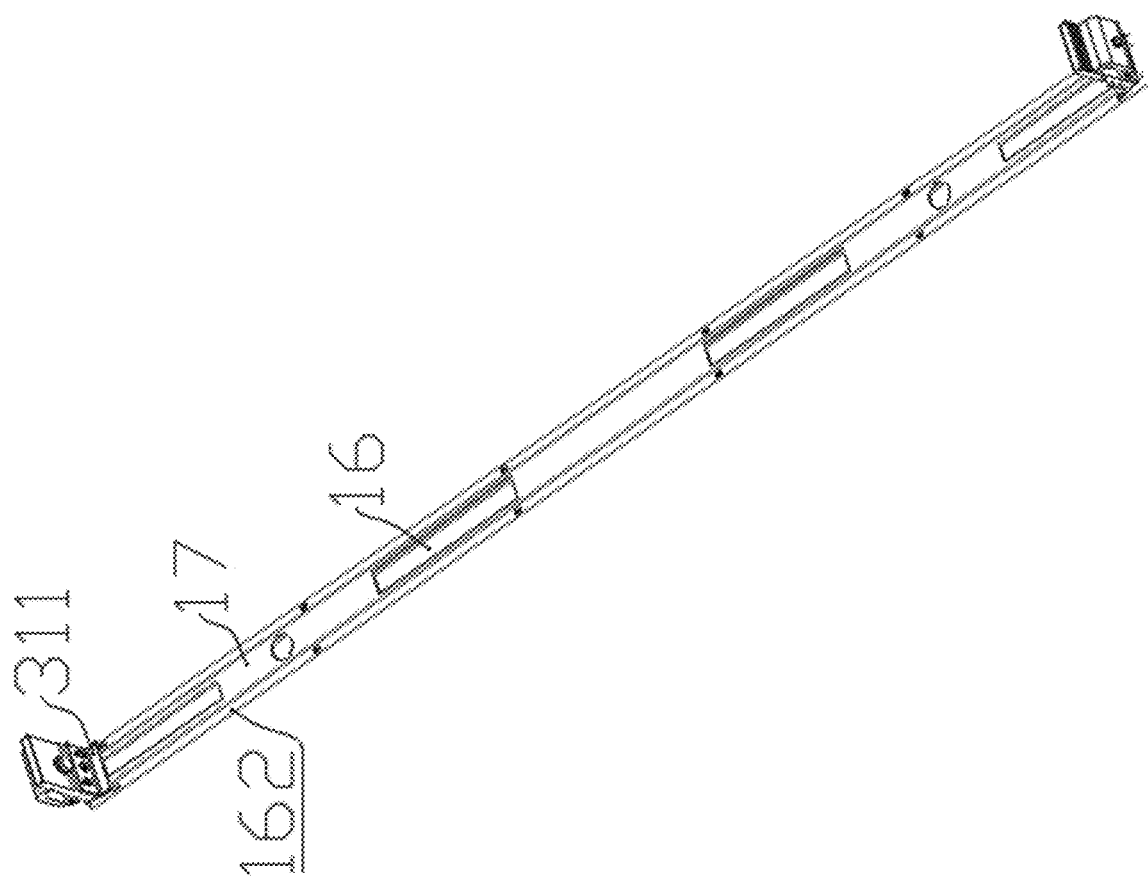
FIG. 10 is a schematic diagram of the structure of the tank body and the cover plate.
Figure 11:
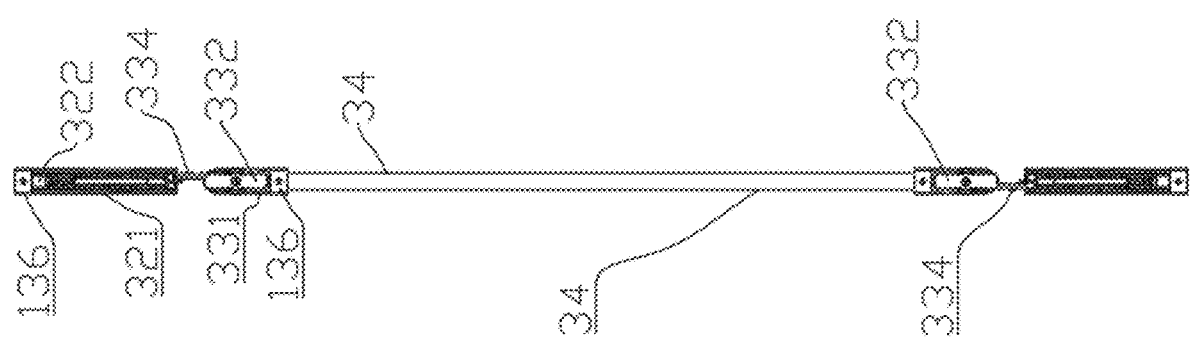
FIG. 11 is a bottom view of the bolt assembly and the operating assembly.
Figure 12:
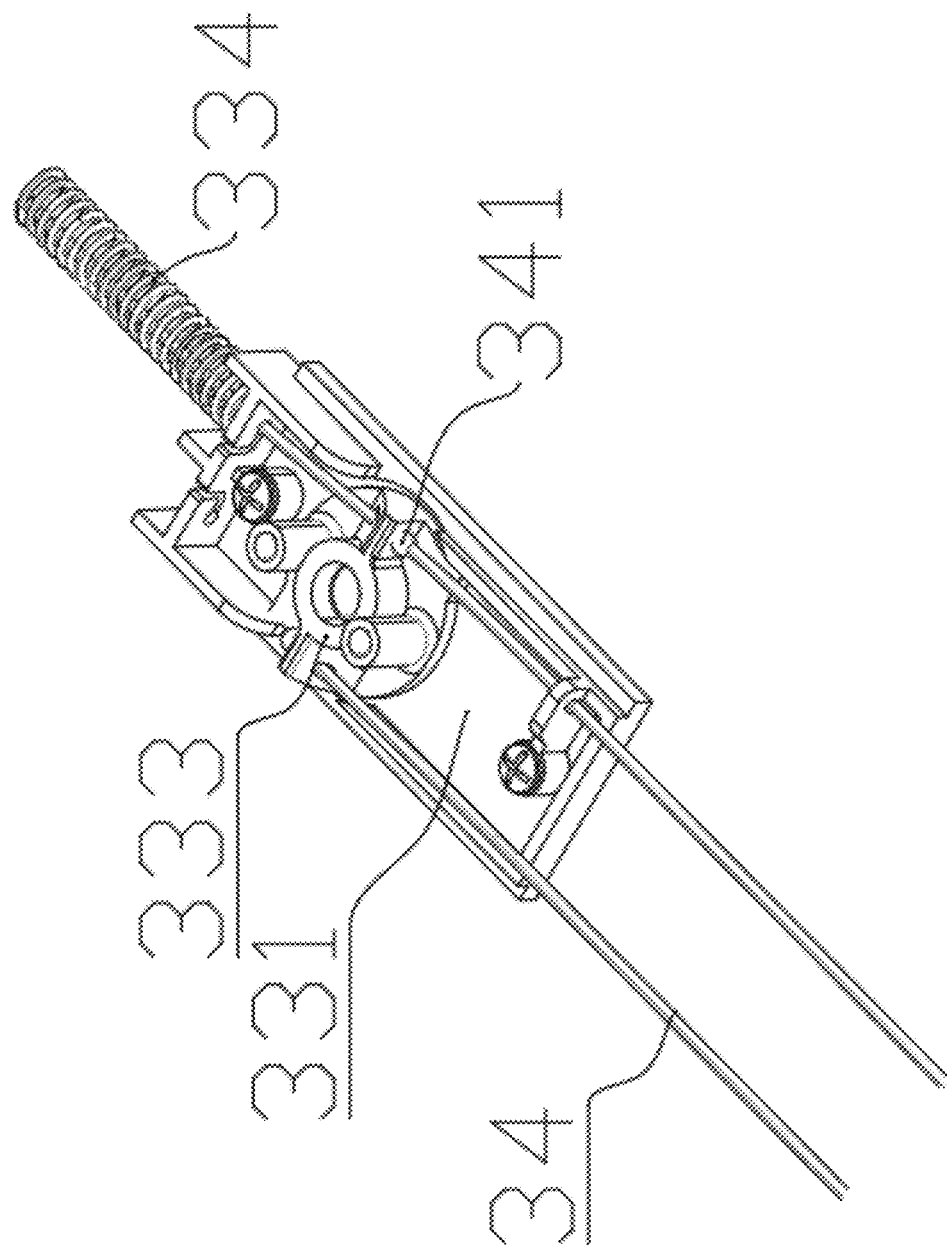
FIG. 12 is a schematic diagram of the structure of the rotating frame, the pull rope and the base.
Figure 13:
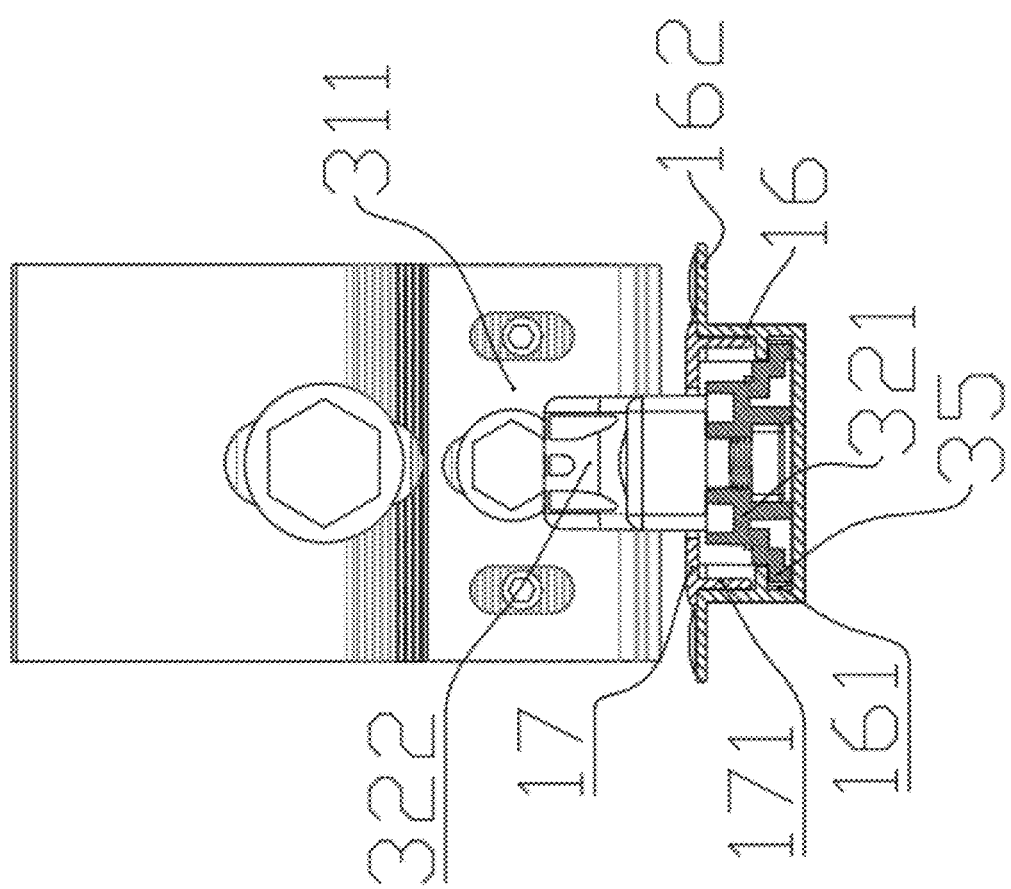
FIG. 13 is a cross-sectional view of the bolt seat in the groove body.
Figure 14:
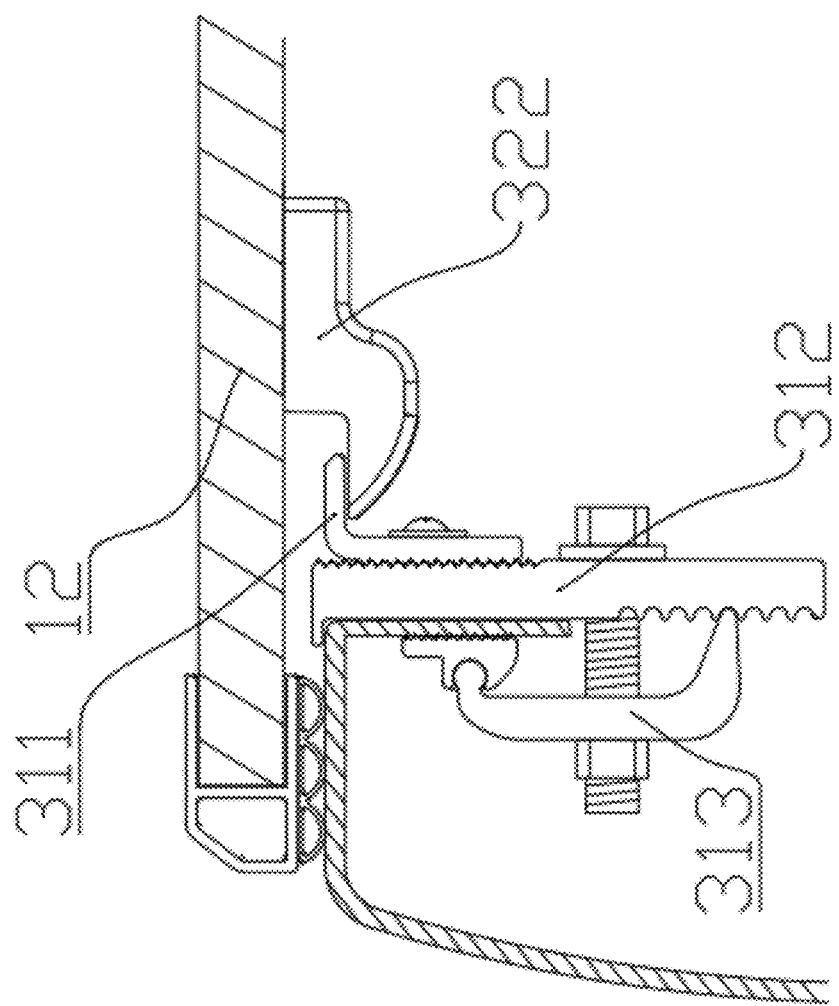
FIG. 14 is a side view of the lock plate assembly.
Figure 15:
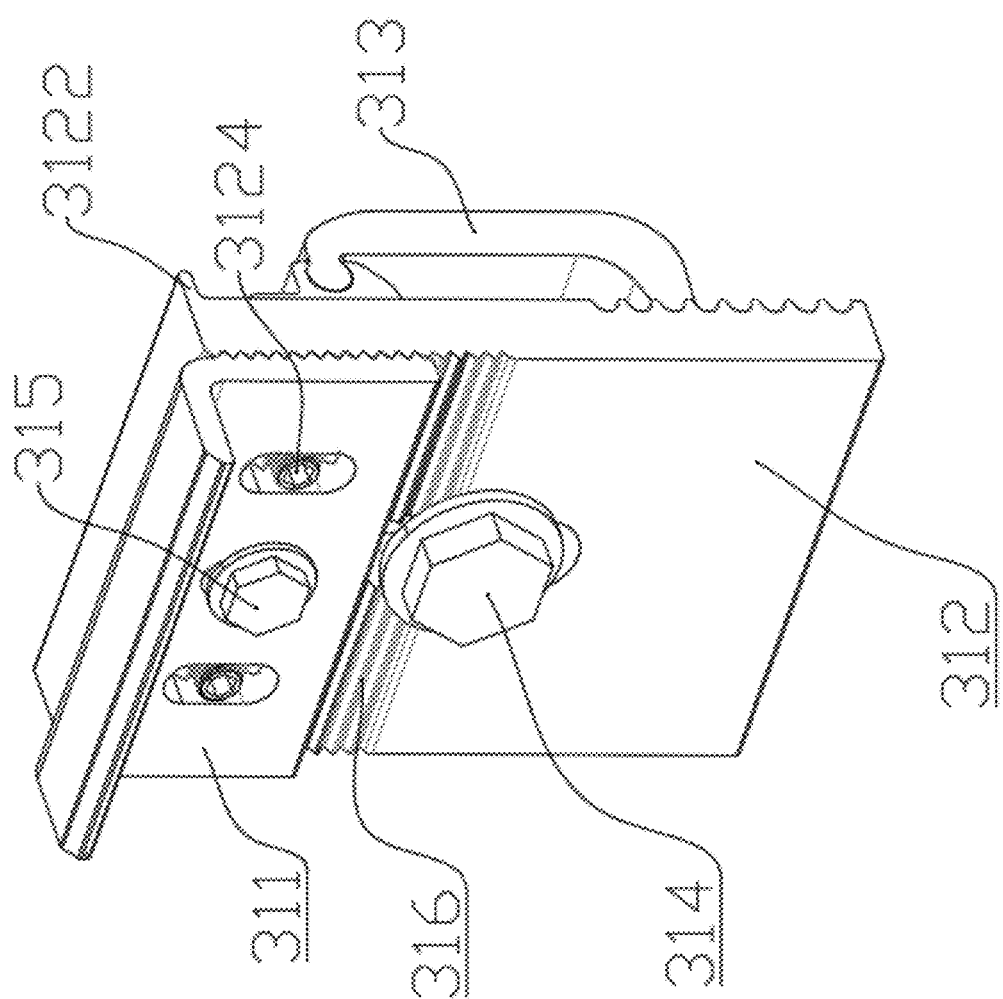
FIG. 15 is a schematic structural diagram of a lock plate assembly.
Figure 16:
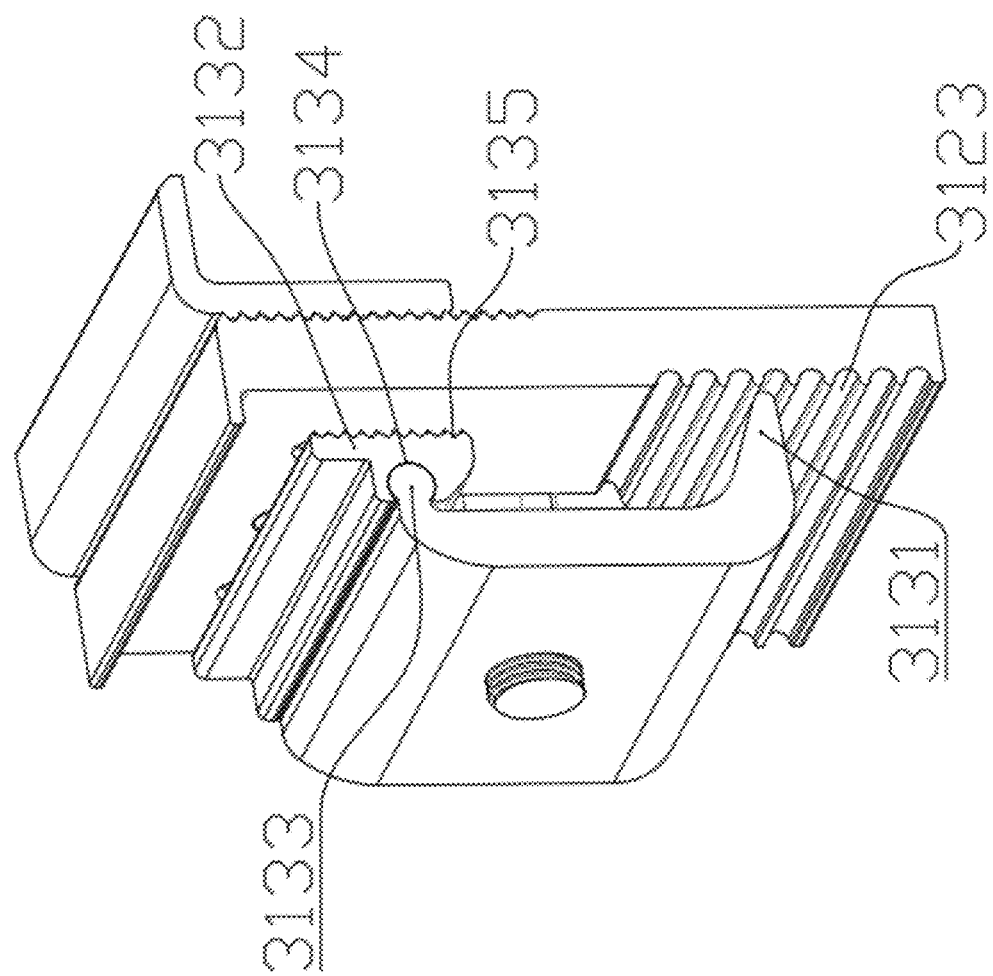
FIG. 16 is a schematic diagram of the back structure of the lock plate assembly.
Figure 17:
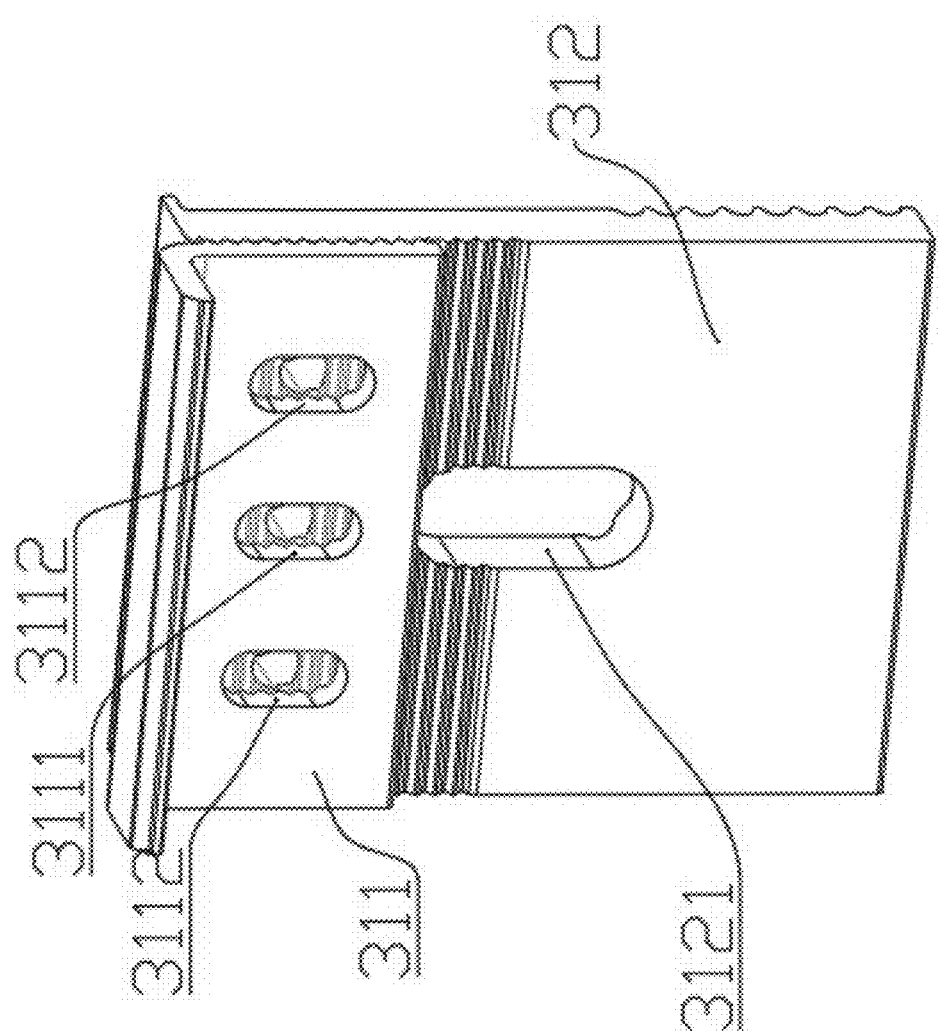
FIG. 17 is a schematic structural diagram of the first inner clamping plate and the first locking plate.
Figure 18:
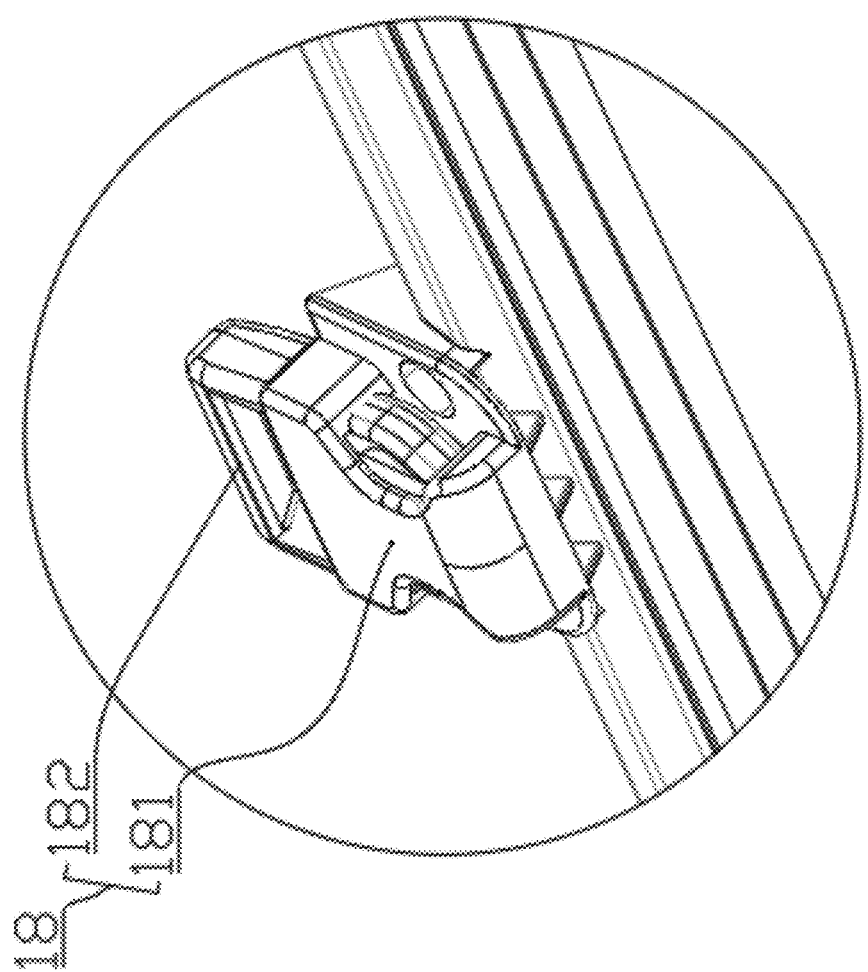
FIG. 18 is a partial enlarged view of point C in FIG. 1.
Figure 19:
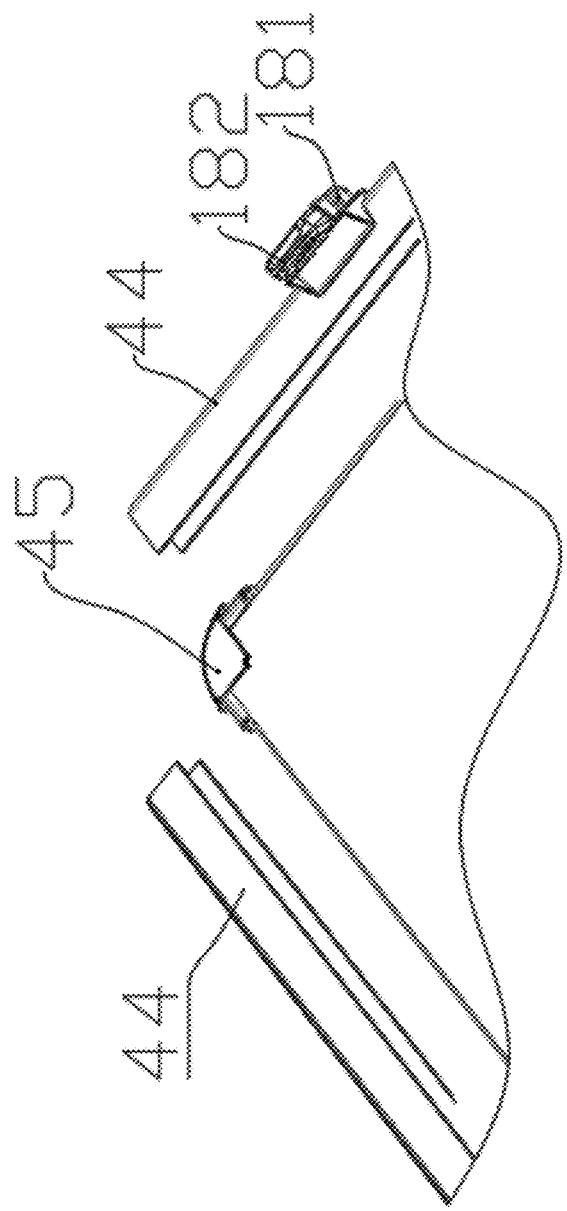
FIG. 19 is a schematic diagram of the split structure of the protective corners and the protective strips.
Figure 20:
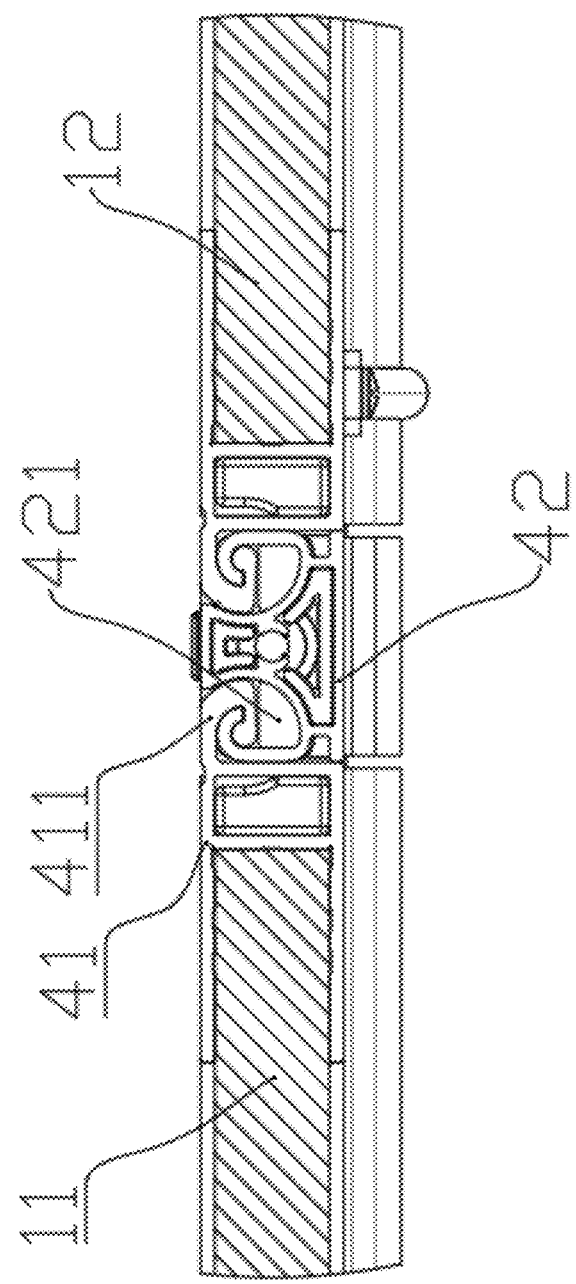
FIG. 20 is a cross-sectional view of the first connecting member and the second connecting member.
Figure 21:
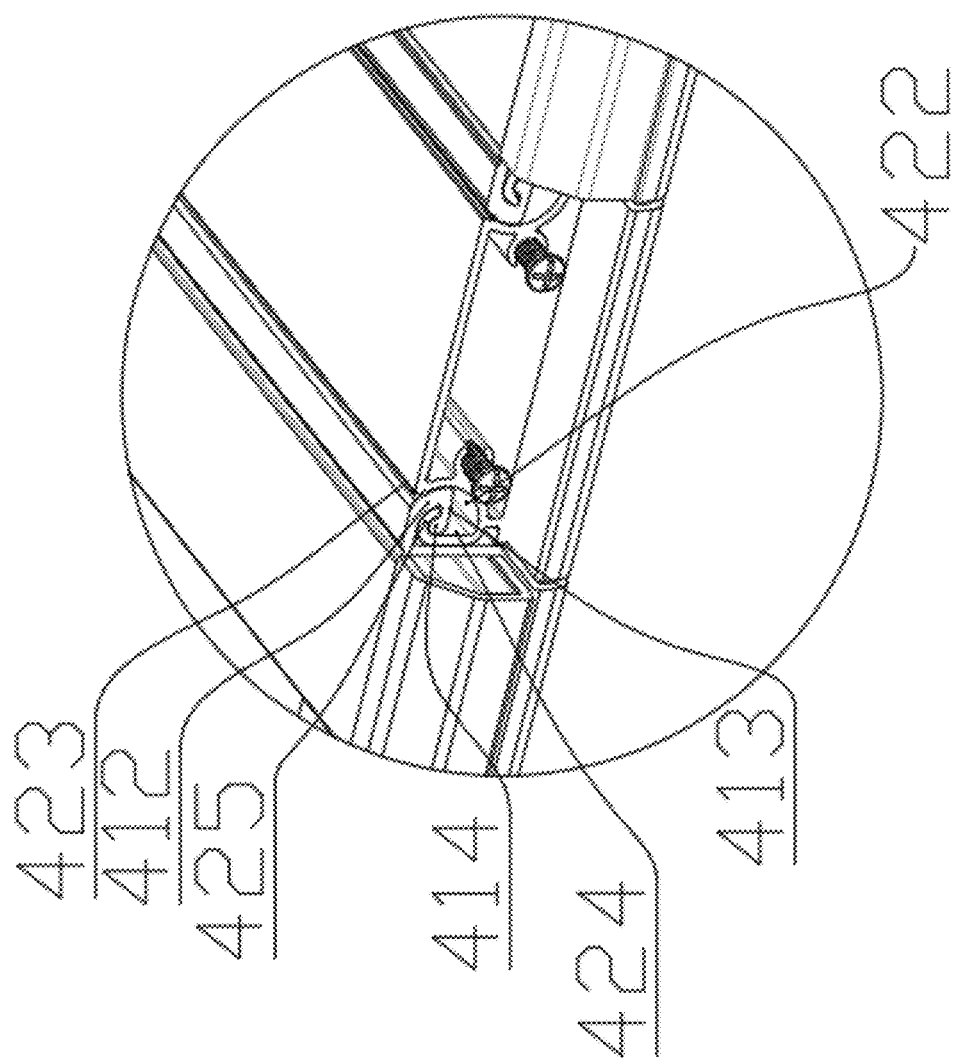
FIG. 21 is a schematic diagram of the structure of the first connecting member and the second connecting member.
Figure 22:
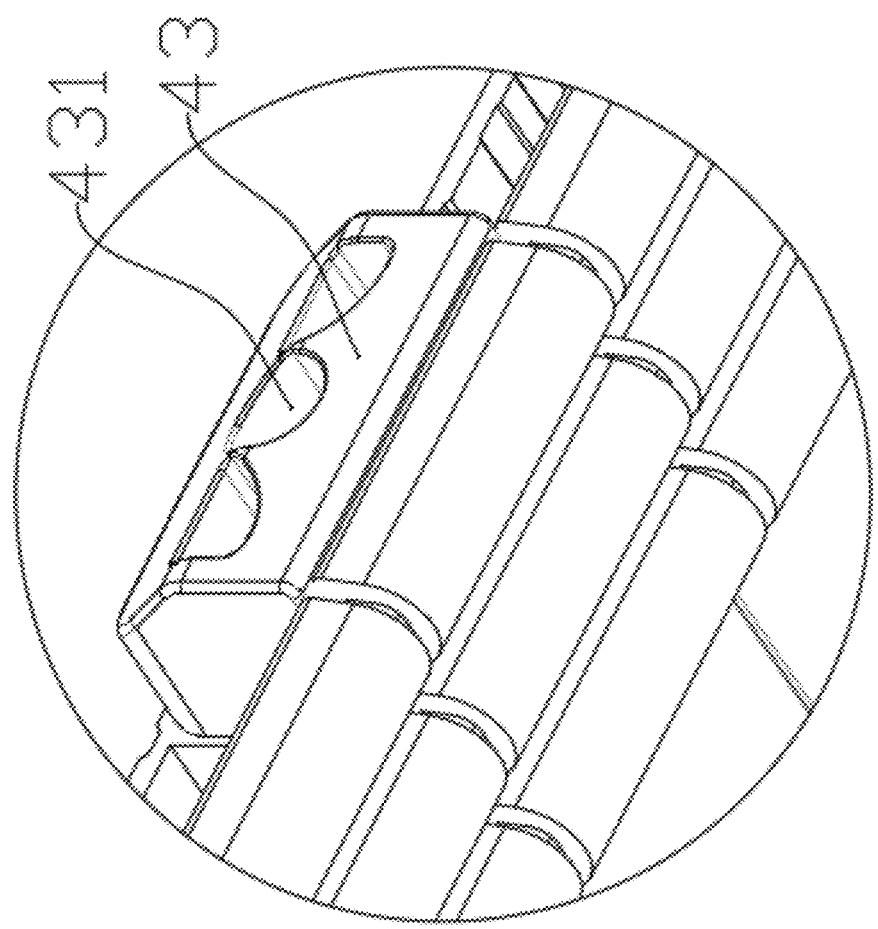
FIG. 22 is a partial enlarged view of point B in FIG. 1.
Figure 23:
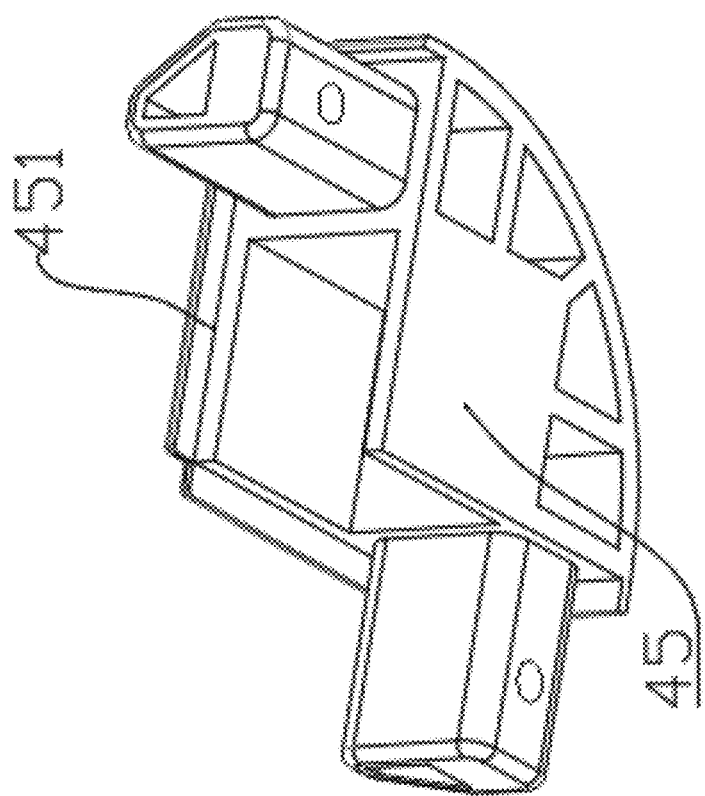
FIG. 23 is a schematic diagram of the structure of the protective corner.
Figure 24:
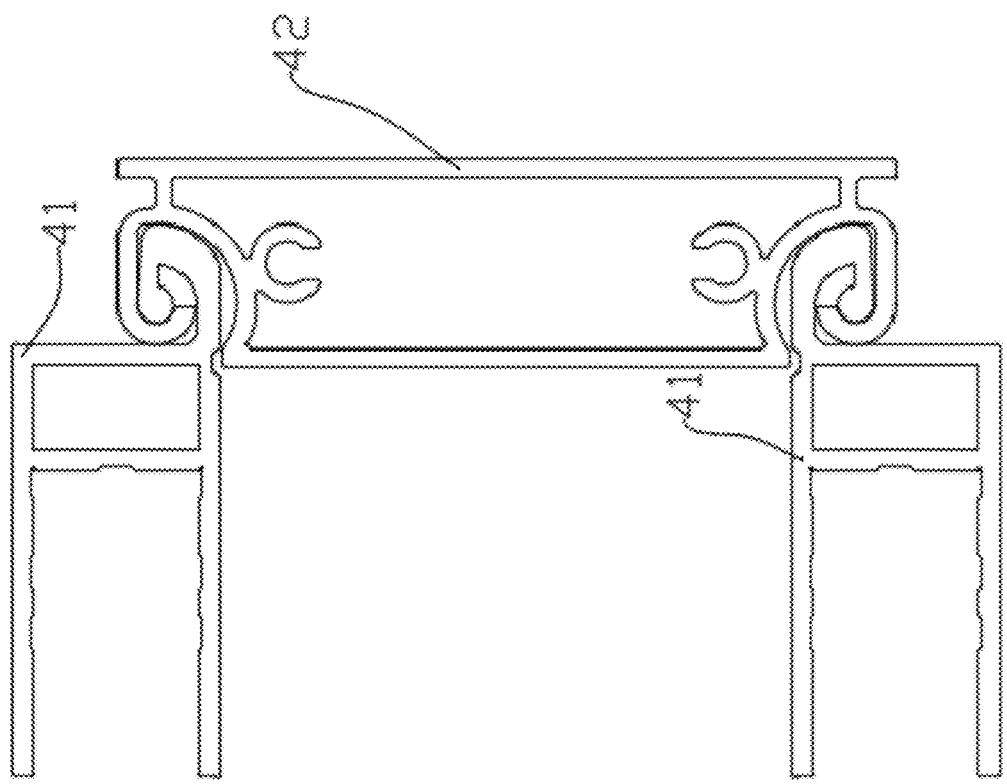
FIG. 24 is a schematic diagram of the structure of the first connecting member and the second connecting member when being folded.
Figure 25:
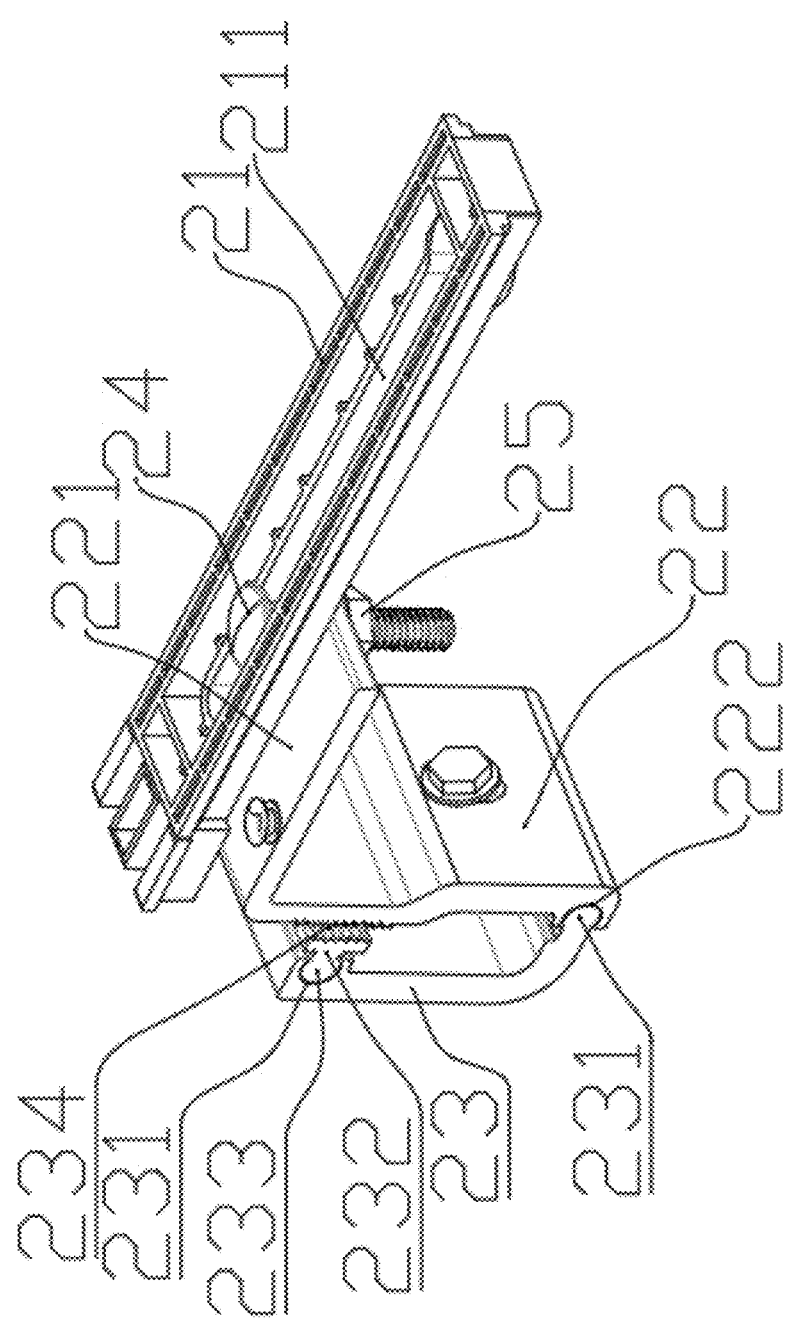
FIG. 25 is a schematic diagram of the structure of the fastening assembly.
Figure 26:
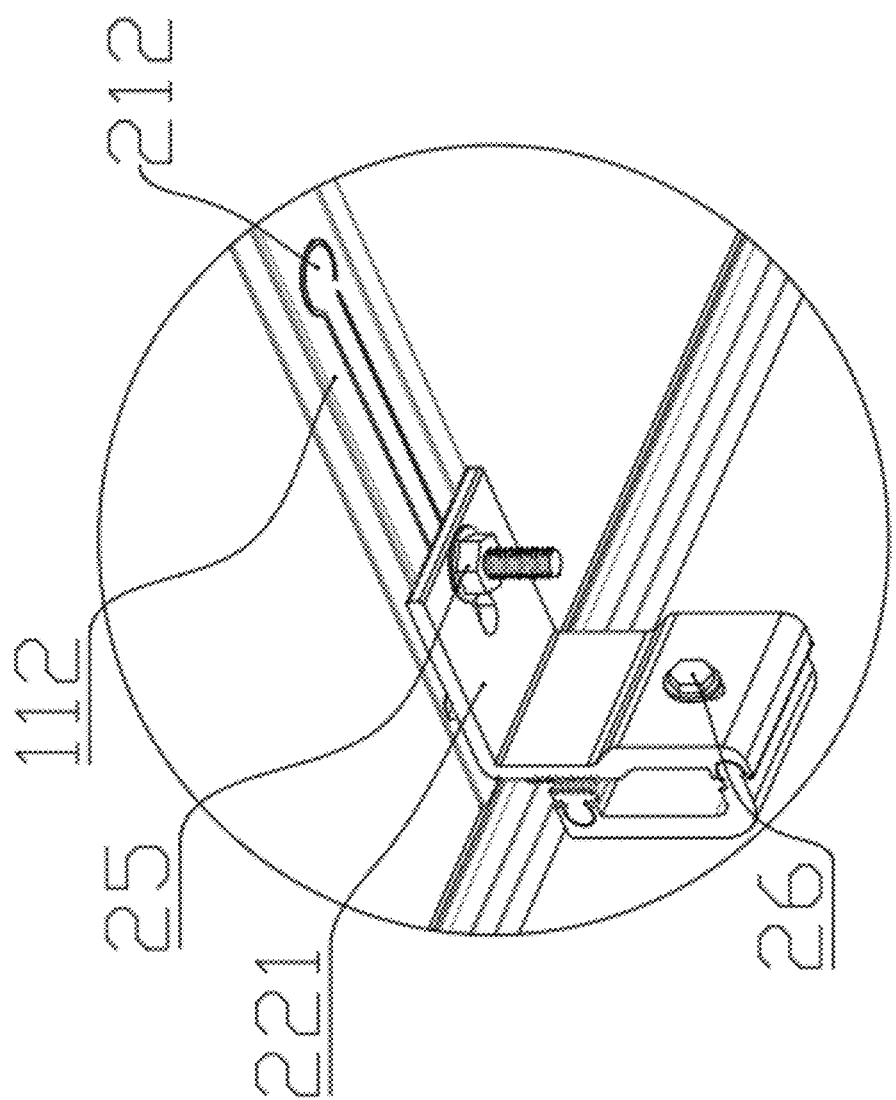
FIG. 26 is a partial enlarged view of point A in FIG. 1.
Figure 27:
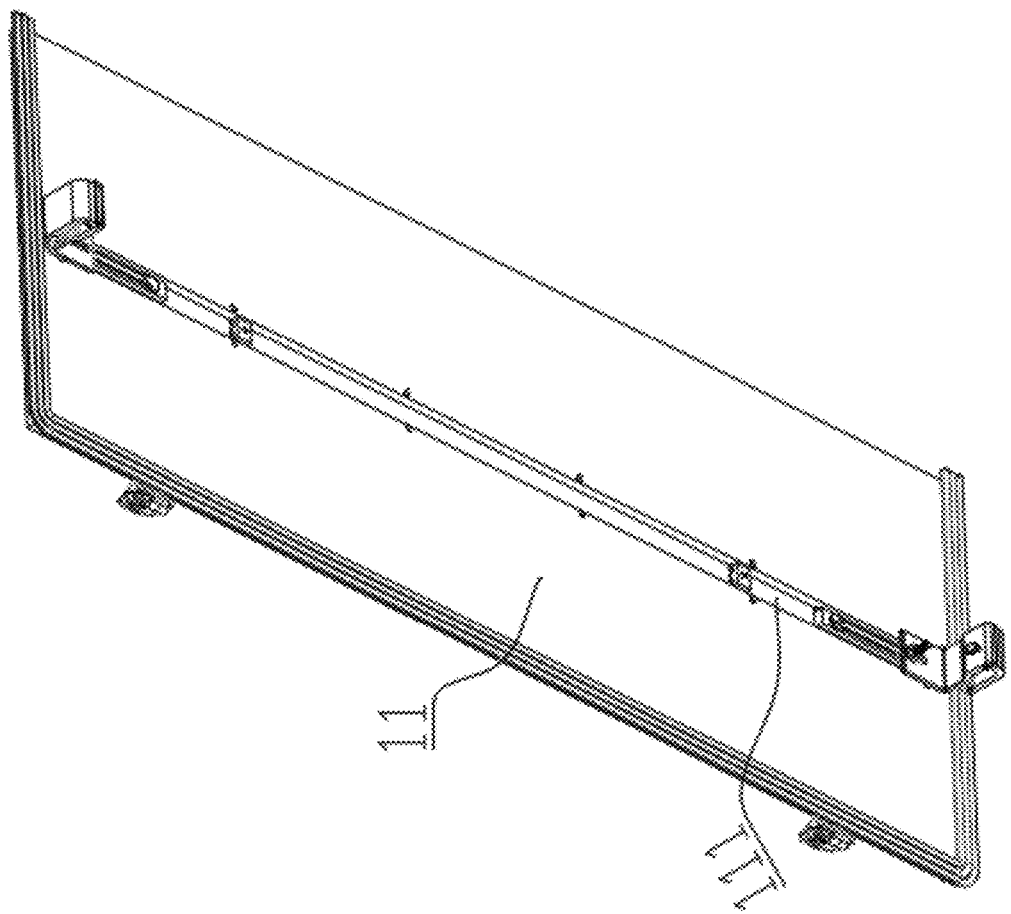
FIG. 27 is a schematic diagram of the structure after the shielding plate is removed from the lower surface of the first cover plate.

The following is a further description of the embodiments of the present invention in conjunction with the accompanying drawings.

As shown in the figure, a pickup truck rear compartment cover includes a cover mechanism 1, the cover mechanism 1 includes a first cover 11, a second cover 12 and a third cover 13 connected in sequence, a fixing mechanism 2 is provided between the lower surface of the first cover 11 and the rear compartment side wall, a locking mechanism 3 is provided between the lower surfaces of the second cover 12 and the third cover 13 and the rear compartment side wall, a connecting mechanism 4 is provided between the first cover 11 and the second cover 12 and between the second cover 12 and the third cover 13 to connect the two, and the cover mechanism 1 has a flat arrangement and covers the rear compartment. The first state and the second state of folding, stacking and opening the rear compartment; the cover mechanism can be divided into three parts, the first cover is fixedly installed on the rear compartment by a fixing mechanism, and the second and third cover plates can be opened and closed by a locking mechanism, the second and third cover plates can be folded and stacked by a connecting mechanism when opened, and stacked above the first cover plate, and when operating the locking mechanism, only one side needs to be operated to open the other side at the same time, which significantly simplifies the operation process, and the connecting mechanism can be used for drainage while folding, and has the advantages of good practicality and easy operation.

After the cover plate mechanism is folded, the first cover plate is located at the bottom layer, the third cover plate is located at the middle layer, and the second cover plate is located at the top layer.

The locking mechanism 3 includes a lock plate assembly 31 installed on the two side walls of the rear compartment, and a plurality of lock tongue assemblies 32 and a plurality of operating assemblies 33 installed on the lower surfaces of the second cover plate 12 and the third cover plate 13. The lock tongue assemblies 32 are located on both sides of all the operating assemblies 33, and a pull rope 34 connecting the two is provided between one operating assembly 33 and another lock tongue assembly 32, and the pull rope 34 passes through the other operating assembly 33 located between the operating assembly 33 and the lock tongue assembly 32; the lock plate assembly 31 includes a first lock plate 311 extending toward the lock tongue assembly 32, and the lock tongue assembly 32 is located directly below the first lock plate 311 when it is not unlocked by the operating assembly 33; the pull rope can enable an operating assembly to simultaneously drive the lock tongue assemblies at both ends to complete the unlocking and locking actions, thereby significantly improving the operating efficiency and having the advantages of good practicality and convenient operation.

Among them, a lock tongue assembly and an operating assembly are set as a group at one end of the cover plate, and another lock tongue assembly and another operating assembly are set as a group at the other end of the cover plate. The two groups of lock tongue assemblies and operating assemblies are in a straight line, and the number of pull ropes is also two, and one pull rope runs through another operating assembly located between an operating assembly and a lock tongue assembly.

The locking tongue assembly 32 comprises a locking tongue seat 321 is slidably mounted on both sides of the lower surface of the second cover plate 12 and the third cover plate 13; and locking tongue 322, which is mounted on the locking tongue seat 321.

The lock tongue seat 321 is provided with a first sliding groove 3211 arranged along the length direction and passing through from top to bottom, and step surfaces 3214 are provided on both sides of the lower part of the first sliding groove 3211. A first adjustment component for adjusting the installation position of the lock tongue 322 on the lock tongue seat 321 is provided between the lock tongue 322 and the lock tongue seat 321; the lock tongue in this embodiment can be adjusted on the lock tongue seat by the first adjustment component, so as to adapt to different models of pickup trucks, and has the advantages of good practicality and easy operation.

The first adjustment component adopts a first bolt 323 passing through the lock tongue 322 and a first nut 324 threadedly matched with the first bolt 323, and the first nut 324 is in contact with the step surface 3214; the upper surface of the lock tongue seat 321 is provided with a plurality of first positioning grooves 3212 arranged along the length direction, and the lower part of the lock tongue 322 is provided with a first positioning block 3221 adapted to the first positioning groove 3212; after the first bolt and the first nut are loosened, the lock tongue can be adjusted on the lock tongue seat, and the first bolt and the first nut are tightened after the position is determined, and the lock tongue can be fixed after the lock tongue is adjusted to the position by the plug-in cooperation of the first positioning block and the first positioning groove.

A pull rope connecting the operating component at one end and the locking tongue component at the other end is provided, and the pull rope passes through another operating component located between the operating component and the locking tongue component. The two operating components are linked to each other. When the operating component on one side is operated by a person, the operating component on the other side will be driven to move synchronously through the pull rope to complete the unlocking action of the locking tongues on both sides.

The operation component 33 includes a base 331, which is fixedly mounted on the lower surfaces of the second cover plate 12 and the third cover plate 13; a handle 332 rotatably mounted on the base 331; and a rotating frame 333, which is rotatably mounted on the base 331 and is linked to the handle 332.

The pull rope 34 passes through all the rotating frames 333 and the base 331 in sequence and is connected to the lock tongue seat 321. An elastic member 334 is provided between the base 331 and the lock tongue seat 321 to resist the two. The elastic member adopts a spring to provide a pre-tightening force for the lock tongue to reset. When the handle is rotated, it will drive the rotating frame to rotate synchronously. The pull rope runs through the rotating frame, so when the rotating frame rotates, there will be a pulling force on the pull rope, and this force will be transmitted to the lock tongue seat on the other side, so that the two lock tongue seats can be synchronized.

In addition, when the rotating frame rotates, the pull rope will be wrapped around the rotating frame, and the locking tongue components on both sides will be pulled to complete the unlocking action.

The preload force of the elastic member can also be used to provide a preload force for resetting the rotating frame.

Fixedly installed limiting beads 341 are respectively provided at both ends of the pull rope 34 and at the position corresponding to the rotating frame 333. The lock tongue seat 321 is provided with a notch 3213 for the pull rope 34 to pass through. The size of the notch 3213 is smaller than the outer diameter of the limiting beads 341. After the pull rope passes through the slot, the limiting beads will get stuck in the slot to play a fixing role. The limiting beads are provided at the position of the pull rope corresponding to the rotating frame so that the rotating frame and the pull rope can realize linkage action. When the rotating frame is driven by the handle to rotate, the rotating frame drives the pull rope to twist through the limiting beads.

The light board in this embodiment has a switch and a battery box, and is used for lighting in a dark environment. The light board can also be cancelled according to customer needs, or only a light board can be set on the lower surface of one cover plate.

The second cover plate 12 and the third cover plate 13 are provided with a first mounting groove 15 and a groove body 16 embedded in the first mounting groove 15 and for placing the lock tongue assembly 32, the operating assembly 33 and the light board 14, and a cover sheet 17 for covering is installed on the groove body 16, and the light board is fixedly connected to the cover sheet 17. In this embodiment, the operating assembly and the lock tongue assembly are both installed in the groove body and hidden under the cover sheet, and only the lock tongue, the handle and the light board are exposed.

The two side surfaces of the lock tongue seat 321 and the base 331 are respectively provided with ribs 35 arranged along the length direction, and the two side walls of the groove body 16 are provided with guide grooves 161 that slide and cooperate with the ribs 35, and the two sides of the lower surface of the cover plate 17 are provided with positioning plates 171 that are inserted into the groove body 16 and fit the inner walls of the two sides of the groove body 16; the two ends of the groove body are through, and the lock tongue seat and the base are inserted from one end of the groove body along the guide groove. During installation, the operator pushes the lock tongue seat and the base to move so that the ribs slide along the guide groove to the corresponding position. The guide groove has a limiting effect on the ribs, which can prevent the lock tongue seat and the base from detaching from the groove body. Then the lock tongue assembly and the operating assembly are installed, and the positioning plate under the cover plate is inserted into the groove body.

The installation method of the rotating frame is the same as that of the bolt seat, that is, the rotating frame is slid into the groove from one end of the groove body along the guide groove, and is fixed with screws after reaching the appropriate position.

The groove body 16 is provided with wing plates 162 on both sides and the wing plates 162 are fixedly installed on the lower surfaces of the second cover plate 12 and the third cover plate 13 by rivets. The groove body 16 is provided with a limit seat 136 for limiting at a position next to the base 331 and the lock tongue seat 321. A screw connecting the cover plate 17 and the limit seat 136 is provided between the two. The cover plate is detachable, and the limit seat is located at both ends of the base and the lock tongue seat, which can limit the positions of the two to ensure the stability of the work. The installation method of the limit seat is the same as that of the base, and it also slides in the guide groove through the ribs on both sides.

The lock plate assembly 31 further includes a first inner clamping plate 312 and a first outer clamping plate 313. The first lock plate 311 is adjustable in position up and down on a side surface of the first inner clamping plate 312 away from the side wall of the rear compartment. The cross section of the first lock plate 311 is in an inverted L shape. A first fastener 314 is provided between the first inner clamping plate 312 and the first outer clamping plate 313 to connect the two. The first inner clamping plate 312 is provided with a first strip hole 3121 vertically arranged. The first fastener 314 passes through the first strip hole 3121. 121 is threadedly matched with the first outer clamping plate 313; the first inner clamping plate and the first outer clamping plate are fixed to the side wall of the rear compartment by the first fastener, and then the upper and lower positions of the first lock plate are adjusted so that the position of the first lock plate just matches the lock tongue assembly, which has the advantages of good practicality and simple operation; if the position of the first lock plate is too high, there will be a gap between it and the lock tongue, and the second cover plate and the third cover plate will be loose; if the first lock plate is too low, it will interfere with the lock tongue, thereby affecting the locking of the second cover plate and the third cover plate.

In addition, the first fastener is a bolt, and the first inner clamp and the first outer clamp will clamp the rear compartment side wall after tightening the bolt, thereby firmly installing it. In addition, the setting of the first strip hole enables the first outer clamp to always match the first inner clamp when adjusting the height.

A locking bolt 315 is provided between the first inner clamping plate 312 and the first locking plate 311 to connect the two, and the side walls where the two contact each other are provided with positioning lines 316, and the positioning lines 316 are V-shaped grooves. V-shaped grooves are provided on the locking plate and the outer clamping plate, and the two mesh with each other, so that the positioning effect is good.

The first lock plate 311 is provided with a second strip hole 3111 arranged vertically, and the locking bolt 315 passes through the second strip hole 3111 and is threadedly engaged with the first inner clamping plate 312; the upper end of the first inner clamping plate 312 is provided with a hanging plate portion 3122 extending laterally and used for hanging on the top end of the rear compartment side wall; the locking bolt passes through the first lock plate and is threadedly engaged with the first inner clamping plate, the positioning pattern can prevent the first lock plate from sliding down, and the setting of the second strip hole can make the first lock plate always adapt to the first inner clamping plate when adjusting the height position.

A plurality of second positioning grooves 3123 arranged vertically are provided on one side surface of the first inner plate 312 facing the first outer plate 313, and a plug 3131 is provided at the bottom end of the first outer plate 313 to be inserted into the second positioning groove 3123, and the second positioning groove 3123 and the plug 3131 are matched in an arc shape; the contact surfaces of the plug and the second positioning groove are both arc surfaces, which can enable an appropriate angle to exist between the first outer plate and the first inner plate, so as to adapt to the side walls of the rear compartment with different inclination angles.

The upper end of the first outer clamping plate 313 is provided with a first arc-shaped protrusion 3133 and a first cushion block 3132 installed on the first arc-shaped protrusion 3133, and the first cushion block 3132 is provided with a first arc-shaped groove 3134 adapted to the first arc-shaped protrusion 3133 and realizing a swinging action; the first cushion block can be swung to adjust the angle, so that the first cushion block always fits the side wall of the rear compartment.

The first pad 3132 has a first anti-skid pattern 3135 on one side facing the first inner clamping plate 312, which plays an anti-skid role.

The first inner clamping plate 312 is provided with threaded adjustment screws 3124 at both ends in the horizontal direction, and the first locking plate 311 is provided with a plurality of avoidance holes 3112 for avoiding the adjustment screws 3124; the back side of the first inner clamping plate is in contact with the side wall of the rear compartment, but sometimes the side wall of the rear compartment is uneven, which will cause the installation of the first inner clamping plate to be uneven, thereby affecting the accuracy of subsequent installation. By setting a hexagonal adjustment screw on the first inner clamping plate, turning the adjustment screw so that the adjustment screw touches the side wall of the rear compartment and then continuing to turn the adjustment screw until the first inner clamping plate reaches a balanced state, in addition, by setting the avoidance hole, interference between the locking plate and the adjustment screw can be prevented.

The connecting mechanism 4 comprises a first connecting member 41, which is installed on both sides of the second cover plate 12, on the side of the first cover plate 11 close to the second cover plate 12, and on the side of the third cover plate 13 close to the second cover plate 12; a second connecting member 42, which is movably installed between two adjacent first connecting members 41; and a connecting strip 411 extends outward from the upper edge of the first connecting member 41, and second mounting grooves 421 are symmetrically arranged on both sides of the second connecting member 42 and for the connecting strip 411 to be inserted.

The connecting strip 411 has a first state in which the second mounting groove 421 is covered when the cover mechanism 1 is not folded, and a second state in which the connecting strip 411 is inserted along the inner wall trajectory of the second mounting groove 421 when the cover mechanism 1 is folded. There is a gap between the inner wall of the second mounting groove 421 and the outer wall of the connecting strip 411. When the connecting strip 411 is in the first state, a drainage channel for rainwater to flow is formed inside the second mounting groove 421; the folding and flattening states of the cover mechanism are realized by the first connecting member and the second connecting member. In addition, on rainy days, rainwater can enter the drainage channel from the gap between the inner wall of the second mounting groove and the outer wall of the connecting strip 3, and then be discharged from both sides of the cover mechanism, without the need to set up additional drainage pipes. The structure is simple, cost-reduced, and practical.

The cross section of the second mounting groove 421 is a quarter circle, and the second mounting groove 421 includes an arc inner wall surface 422, an opening 423 located at the upper end of the arc inner wall surface 422, and a vertical surface 424 located at the other end of the arc inner wall surface 422. The connecting strip 411 includes an arc edge 412 entering from the opening 423 and adapting to the arc inner wall surface 422, and a limiting surface 413 contacting and cooperating with the vertical surface 424; each cover plate and the second connecting member can be folded 90°, and two adjacent cover plates can be in a parallel state after being folded; the arc edge is always inserted into the opening, and there is a gap between the two, so that rainwater can enter the mounting groove; in addition, when the limiting surface contacts the vertical surface, it means that the cover plate and the second connecting member are folded in place, and the two are just in a vertical state.

An arc-shaped hook 425 is provided at the upper end of the vertical surface 424, and an arc-shaped convex strip 414 rotatably matched with the arc-shaped hook 425 is provided at the end position of the limiting surface 413 of the connecting strip 411; during the folding process of the cover mechanism, the center of the circle is the center of the arc-shaped convex strip, and the cooperation between the arc-shaped convex strip and the arc-shaped hook can prevent the first connecting member from being detached from the second connecting member.

The second connecting member 42 is provided with fixedly installed protective covers 43 at both ends, and the protective cover 43 is provided with a water outlet 431 connected to the drainage channel. Rainwater is collected in the installation groove and then discharged through the water outlet; the cover mechanism 1 is also provided with a protective strip 44 covering the edge and a protective corner 45 covering the four corners, and the protective corner 45 is located between the two protective strips 44 and plugged with the protective strip 44. The protective strip 44 covers the gap between the protective cover 43 and the cover mechanism 1, and the protective corner 45 is also provided with a shielding plate 451 extending outward and used to cover the gap. Due to the different vehicle models, it is sometimes necessary to process the cover mechanism into a trapezoidal structure. If the protective strips and protective corners of the original rectangular cover are used, gaps will be left, which is very unsightly. Therefore, the protective corners of this embodiment cover the gaps by adding a cover plate and lengthening the size of the protective strip, thereby solving the problem of poor aesthetics after using the same protective strips and protective corners for different models of covers.

A safety buckle assembly 18 is installed on the edge of the upper surface of the first cover plate 11, and the safety buckle assembly 18 includes a buckle seat 181, a buckle 182 and a safety belt (not shown). A handle 121 for winding the safety belt is provided on the lower surface of the second cover plate 12. After the cover plates are folded and stacked, the safety belt is passed through the handle, and then the buckle is inserted into the buckle seat to fix the cover plate mechanism.

The fixing mechanism 2 comprises a fixing seat 21, which is fixedly mounted on the lower surface of the first cover plate; a second inner clamping plate 22 and a second outer clamping plate 23 are used to clamp the rear compartment side wall; and a second adjustment component for adjusting the installation position of the second inner clamping plate 22 is provided between the fixing seat 21 and the second inner clamping plate 22; by arranging the second adjustment component between the second inner clamping plate and the fixing seat, the position of the fixing mechanism on both sides can be adjusted, so as to adapt to the rear compartments of more models of pickup trucks, and has the advantages of good practicality and simple operation.

The fixing seat 21 is provided with a second sliding groove 211 arranged along the length direction, and the upper end of the second inner clamping plate 22 is provided with a flat plate portion 221 that fits the fixing seat 21. The second adjustment assembly includes a second bolt 24 and a second nut 25 that are slidably installed in the second sliding groove 211. The second bolt 24 passes through the flat plate portion 221 and is threadedly matched with the second nut 25. The end position of the second sliding groove 211 is provided with a round hole 212 for the head of the second bolt 24 to pass through; the head of the second bolt can slide in the second sliding groove to adjust the position. The second sliding groove is a long strip through hole. After determining the position, the second nut is tightened to fix the position of the second outer clamping plate; the fixing seat is fixed on the cover plate and cannot be disassembled, so a round hole is required for the head of the second bolt to pass through, so as to be hung in the second sliding groove.

A third mounting groove 111 for fixing the fixing seat 21 and a baffle plate 112 covering the fixing seat 21 are provided on the lower surface of the first cover plate; a second fastener 26 connecting the second outer clamp plate 23 and the second inner clamp plate 22 is provided between the two; the fixing seat is hidden in the third mounting groove on the lower surface of the first cover plate, and then covered by the baffle plate, leaving only the second sliding groove exposed; the second fastener is a bolt and a nut, and tightening the bolt can allow the second outer clamp plate and the second inner clamp plate to clamp the side wall of the rear compartment together.

A third arc-shaped protrusion 231 is provided at the lower end of the second outer clamping plate 23, and a third arc-shaped groove 222 adapted to the third arc-shaped protrusion 231 and provided for swinging installation is provided at the lower end of the second inner clamping plate 22; the third arc-shaped protrusion can swing in the third arc-shaped groove, so as to adapt to the rear compartment side walls with different inclination angles.

The upper end of the second outer clamping plate 23 is provided with a second arc groove 231 and a second cushion block 232 embedded in the second arc groove 231; the second cushion block 232 is provided with a second arc protrusion 233 adapted to the second arc groove 231 and capable of swinging; the second cushion block can swing in the second arc groove to adjust the angle, so that the second cushion block always fits the side wall of the rear compartment.

The second cushion block 232 and the second inner clamping plate 22 are both provided with second anti-skid patterns 234 on one side facing the rear compartment side wall to play an anti-skid role.

In the description of the present invention, it should be noted that the terms "center," "longitudinal." "lateral," "up," "down," "front," "back," "left," "right," "vertical," "horizontal," "top," "bottom," "inside," "outside," and the like indicate directions or positional relationships based on the directions or positional relationships shown in the accompanying drawings, and are only for the convenience of describing the present invention and simplifying the description, and do not indicate or imply that the device or element referred to must have a specific direction, be constructed and operated in a specific direction, and therefore cannot be understood as a limitation on the present invention. In addition, the terms "first" and "second" are used for descriptive purposes only and should not be understood as indicating or implying relative importance.

In the description of the present invention, it should be noted that, unless otherwise clearly specified and limited, the terms "installation," "connection" and "connection" should be understood in a broad sense. For example, it can be a fixed connection, a detachable connection, or an integral connection; it can be a mechanical connection or an electrical connection; it can be a direct connection or an indirect connection through an intermediate medium, and it can be the internal connection of two components. For those skilled in the art, the specific meanings of the above terms in the present invention can be understood according to specific circumstances. In addition, in the description of the present invention, unless otherwise specified, "plurality" means two or more.

People in the art should note that although the present invention has been described according to the above specific implementation methods, the concept of the present invention is not limited to the embodiments. Any modification using the present invention concept will be included in the scope of protection of this patent.

What is claimed is:

1. A pickup truck rear compartment cover comprising a cover mechanism (1), said cover mechanism (1) having a first cover (11), a second cover (12) and a third cover (13) connected in sequence; a fixing mechanism (2) disposed between a lower surface of the first cover (11) and a side wall of the rear compartment; a locking mechanism (3) disposed between lower surfaces of the second cover (12) and the third cover (13) and the side wall of the rear compartment; a connecting mechanism (4) disposed between the first cover (11) and the second cover (12) and between the second cover (12) and the third cover (13), respectively, and the cover mechanism (1) having a first state which is laid flat and covers the rear compartment, and a second state which is folded and stacked and opens the rear compartment, wherein the connecting mechanism (4) comprises: a first connecting member (4) mounted on both side edges of the second cover plate (12), on the side edge of the first cover plate (11) close to the second cover plate (12), and on the side edge of the third cover plate (13) close to the second cover plate (12); a second connecting member (42) movably mounted between two adjacent first connecting members (41); a connecting strip (411) extends outward from the upper edge of the first connecting member (41), and second mounting grooves (421) are symmetrically arranged on both sides of the second connecting member (42) and are inserted into the connecting strip (411); said connecting strip (411) has a first state in which the second mounting groove (421) is covered when the cover mechanism (1) is not folded, and a second state in which the connecting strip (411) is inserted along the track of the inner wall surface of the second mounting groove (421) when the cover mechanism (1) is folded, and a gap exists between the inner side wall of the second mounting groove (421) and the outer wall surface of the connecting strip (411), and when the connecting strip (411) is in the first state, a drainage channel for rainwater to flow is formed inside the second mounting groove (421).

2. The pickup truck rear compartment cover according to claim 1, wherein the locking mechanism (3) comprises a locking plate assembly (31) mounted on both side walls of the rear compartment and a plurality of locking tongue assemblies (32) and a plurality of operating assemblies (33) mounted on the lower surfaces of the second cover (12) and the third cover (13), and the locking tongue assemblies (32) are located on both sides of all the operating assemblies (33), a pull rope (34) connecting one operating assembly (33) and another locking tongue assembly (32) is provided between the two, and the pull rope (34) passes through the other operating assembly (33) located between the operating assembly (33) and the locking tongue assembly (32); the locking plate assembly (31) comprises a first locking plate (311) extending in the direction of the locking tongue assembly (32), and the locking tongue assembly (32) is located directly below the first locking plate (311) when not unlocked by the operating assembly (33).

3. The pickup truck rear compartment cover according to claim 2, wherein the locking tongue assembly (32) comprises a lock tongue seat (321) which is slidably mounted on two sides of the lower surface of the second cover plate (12) and the third cover plate (13); a lock tongue (322) mounted on the lock tongue seat (321); wherein the lock tongue seat (321) has a first sliding groove (3211) arranged along the length direction and extending vertically, and step surfaces (3214) are arranged on both sides of the lower part of the first sliding groove (3211); a first adjustment component for adjusting the installation position of the lock tongue (322) on the lock tongue seat (321) is arranged between the lock tongue (322) and the first lock tongue seat (321); the first adjustment component adopts a first bolt (323) passing through the lock tongue (322) and a first nut (324) threadedly matched with the first bolt (323), and the first nut (324) contacts and cooperates with the step surface (3214); the upper surface of the lock tongue seat (321) is provided with a plurality of first positioning grooves (3212) arranged along the length direction, and the lower part of the lock tongue (322) is provided with a first positioning block (3221) adapted to the first positioning groove (3212).

4. The pickup truck rear compartment cover according to claim 2, wherein the operating component (33) comprises a base (331) fixedly mounted on the lower surfaces of the second cover plate (12) and the third cover plate (13); a handle (332) rotatably mounted on the base (331); and a rotating frame (333) is rotatably mounted on the base (331) and is linked to the handle (332); wherein the pull rope (34) passes through all the rotating frames (333) and the base (331) in sequence and is connected to the lock tongue seat (321), and an elastic member (334) is provided between the base (331) and the lock tongue seat (321) to abut against the two; wherein limiting beads (341) are respectively provided at both ends of the pull rope (34) and at positions corresponding to the rotating frame (333), and the lock tongue seat (321) is provided with a notch (3213) through which the pull rope (34) passes, and the size of the notch (3213) is smaller than the outer diameter of the limiting beads (341).

5. The pickup truck rear compartment cover according to claim 3, wherein a light panel (14) is installed on the lower surface of the second cover (12) and the third cover (13); said lower surfaces of the second cover plate (12) and the third cover plate (13) are both provided with a first mounting groove (15) and a groove body (16) embedded in the first mounting groove (15) and for placing the lock tongue assembly (32), the operating assembly (33) and the light panel (14), a cover sheet (17) for covering is installed on the groove body (16), and the light panel is fixedly connected to the cover sheet (17); the lock tongue seat (321) and the base (331) are respectively provided with ribs (35) arranged along the length direction, and both side walls of the groove body (16) are provided with guide grooves (161) that are slidably matched with the ribs (35), and both sides of the lower surface of the cover plate (17) are provided with positioning plates (171) that are inserted into the groove body (16) and fit the inner walls of both sides of the groove body (16); said groove body (16) is provided with wing plates (162) on both sides, and the wing plates (162) are fixedly mounted on the lower surfaces of the second cover plate (12) and the third cover plate (13) by means of rivets, and a limiting seat (136) for limiting is provided in the groove body (16) at a position beside the base (331) and the lock tongue seat (321), and a screw is provided between the cover plate (17) and the limiting seat (136) to connect the two.

6. The pickup truck rear compartment cover according to claim 2, wherein the locking plate assembly (31) further includes a first inner clamping plate (312) and a first outer clamping plate (313), the first locking plate (311) is adjustably mounted on a side surface of the first inner clamping plate (312) away from the rear compartment side wall, and the cross-section of the first locking plate (311) is an inverted L-shape; a first fastener (314) is provided between the first inner clamping plate (312) and the first outer clamping plate (313) to connect the two, and a first vertically arranged first strip hole (3121) is provided on the first inner clamping plate (312), and the first fastener (314) passes through the first strip hole (3121) and is threadedly engaged with the first outer clamping plate (313).

7. The pickup truck rear compartment cover according to claim 6, wherein a locking bolt (315) connecting the first inner plate (312) and the first locking plate (311) is provided between the two, and the side wall surfaces where the two contact each other are provided with positioning lines (316), and the positioning lines (316) are V-shaped grooves, and the first locking plate (311) is provided with a second vertically arranged strip hole (3111), and the locking bolt (315) passes through the second strip hole (3111) and is threadedly engaged with the first inner plate (312); the upper end of the first inner plate (312) is provided with a hanging plate portion (3122) extending laterally and used for hanging on the top end of the rear compartment side wall.

8. The pickup truck rear compartment cover according to claim 6, wherein a plurality of second positioning grooves (3123) arranged vertically are provided on a surface of the first inner clamping plate (312) facing the first outer clamping plate (313); a plug (3131) inserted into the second positioning groove (3123) is provided at the bottom end of the first outer clamping plate (313); and the second positioning groove (3123) and the plug (3131) are matched in an arc; the upper end of the first outer clamping plate (313) has a first arc-shaped protrusion (3133) and a first cushion block (3132) mounted on the first arc-shaped protrusion (3133); the first cushion block (3132) is provided with a first arc-shaped groove (3134) adapted to the first arc-shaped protrusion (3133) and capable of swinging; the first cushion block (3132) is provided with a first anti-slip pattern (3135) on one side facing the first inner clamping plate (312); said first inner clamping plate (312) has threaded adjustment screws (3124) at both ends in the horizontal direction, and the first locking plate (311) is provided with a plurality of avoidance holes (3112) for avoiding the adjustment screws (3124).

9. The pickup truck rear compartment cover according to claim 1, wherein the cross section of the second mounting groove (421) is a quarter circle, and the second mounting groove (421) comprises an arc inner wall surface (422), an opening (423) located at the upper end of the arc inner wall surface (422), and a vertical surface (424) located at the other end of the arc inner wall surface (422), and the connecting strip (411) comprises an arc edge (412) entering from the opening (423) and matching with the arc inner wall surface (422) and a limiting surface (413) contacting and matching with the vertical surface (424); an arc-shaped hook (425) is provided at the upper end of the vertical surface (424), and an arc-shaped convex strip (414) rotatably matched with the arc-shaped hook (425) is provided at the end position of the limiting surface (413) of the connecting strip (411).

10. The pickup truck rear compartment cover according to claim 1, wherein protective covers (43) are provided at both ends of the second connecting member (42), the protective cover (43) is provided with a water outlet (431) connected to the drainage channel, the cover mechanism (1) is also provided with a protective strip (44) covering the edge and a protective corner (45) covering the four corners, the protective corner (45) is located between two protective strips (44) and is plugged into the protective strip (44), the protective strip (44) covers the gap between the protective cover (43) and the cover mechanism (1), and the protective corner (45) is also provided with a shield (451) extending outward and used to cover the gap.

11. The pickup truck rear compartment cover according to claim 8, wherein a safety buckle assembly (18) is installed on the edge of the upper surface of the first cover (11), and the safety buckle assembly (18) includes a buckle seat (181), a buckle (182) and a safety belt, and a handle (121) for winding the safety belt is provided on the lower surface of the second cover (12).

12. The pickup truck rear compartment cover according to claim 1, wherein the fixing mechanism (2) comprises a fixing seat (21) fixedly mounted on the lower surface of the first cover plate; a second inner clamping plate (22) and a second outer clamping plate (23), the two being used in cooperation to clamp the side wall of the rear compartment; a second adjustment component for adjusting the installation position of the second inner clamping plate (22) is provided between the fixing seat (21) and the second inner clamping plate (22); wherein the fixing seat (21) is provided with a second sliding groove (211) arranged along the length direction; the upper end of the second inner clamping plate (22) is provided with a flat plate portion (221) that fits the fixing seat (21); the second adjustment assembly comprises a second bolt (24) and a second nut (25) that are slidably installed in the second sliding groove (211); the second bolt (24) passes through the flat plate portion (221) and is threadedly engaged with the second nut (25); and a round hole (212) for the head of the second bolt (24) to pass through is provided at the end position of the second sliding groove (211).

13. The pickup truck rear compartment cover according to claim 12, wherein the lower surface of the first cover is provided with a third mounting groove (111) for fixing the fixing seat (21) and a shielding plate (112) covering the fixing seat (21), and a second fastener (26) connecting the second outer clamping plate (23) and the second inner clamping plate (22) is provided between the two.

14. The pickup truck rear compartment cover according to claim 12, wherein a third arc-shaped protrusion (231) is provided at the lower end of the second outer clamping plate (23), and a third arc-shaped groove (222) adapted to the third arc-shaped protrusion (231) and provided for swing installation is provided at the lower end of the second inner clamping plate (22); said second outer clamping plate (23) is provided with a second arc-shaped groove (231) and a second cushion block (232) embedded in the second arc-shaped groove (231) at the upper end thereof; the second cushion block (232) is provided with a second arc-shaped protrusion (233) adapted to the second arc-shaped groove (231) and capable of swinging; and the second cushion block (232) and the second inner clamping plate (22) are both provided with a second anti-slip pattern (234) on one side facing the rear compartment side wall.

* * * * *